United States Patent
Nakamura et al.

(10) Patent No.: US 9,155,099 B2
(45) Date of Patent: Oct. 6, 2015

(54) BASE STATION, RADIO COMMUNICATIONS SYSTEM, CONTROL METHOD OF BASE STATION, RADIO COMMUNICATIONS METHOD AND CONTROL PROGRAM

(75) Inventors: Toshifumi Nakamura, Minato-ku (JP); Kojiro Hamabe, Minato-ku (JP); Masayuki Ariyoshi, Minato-ku (JP); Kazushi Muraoka, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 976 days.

(21) Appl. No.: 13/125,722

(22) PCT Filed: Sep. 15, 2009

(86) PCT No.: PCT/JP2009/066579
§ 371 (c)(1),
(2), (4) Date: Apr. 22, 2011

(87) PCT Pub. No.: WO2010/050321
PCT Pub. Date: May 6, 2010

(65) Prior Publication Data
US 2011/0207500 A1    Aug. 25, 2011

(30) Foreign Application Priority Data
Oct. 27, 2008 (JP) .............................. 2008-276028

(51) Int. Cl.
*H04W 72/08* (2009.01)
*H04W 52/32* (2009.01)
*H04W 72/04* (2009.01)
(Continued)

(52) U.S. Cl.
CPC .......... *H04W 72/082* (2013.01); *H04W 52/325* (2013.01); *H04B 2201/70702* (2013.01); *H04B 2201/709709* (2013.01); *H04W 52/143* (2013.01); *H04W 52/243* (2013.01);
(Continued)

(58) Field of Classification Search
USPC .......... 455/522, 69, 234.1, 245.1, 556.1, 450, 455/436, 25, 114.3, 41.1, 232.1; 370/335, 370/235
See application file for complete search history.

(56) References Cited

U.S. PATENT DOCUMENTS

2007/0298825 A1* 12/2007 Kayama et al. ................ 455/522
2009/0252136 A1* 10/2009 Mahany et al. ................ 370/338
(Continued)

FOREIGN PATENT DOCUMENTS

CN        1324554 A    11/2001
CN      101133675 A     2/2008
(Continued)

OTHER PUBLICATIONS

Office Action, dated Mar. 5, 2013, issued by the Japanese Patent Office in counterpart Japanese Application No. 2010-535733.
Office Action issued Jun. 28, 2013, by the Chinese Patent Office in corresponding application No. 200980142913.4.
(Continued)

*Primary Examiner* — Diane Mizrahi
(74) *Attorney, Agent, or Firm* — Sughrue Mion, PLLC

(57) ABSTRACT

[Problems] Because it is not possible to reduce sufficiently the number of base stations that starts uselessly in spite of being in light traffic state, it is not possible to lower interference between adjacent cells and power consumption sufficiently.
[Measures] A base station receives a transmission signal from a mobile station to other base station, and starts transmission of a control signal with predetermined power depending on a reception condition of the transmission signal.

15 Claims, 19 Drawing Sheets

(51) Int. Cl.
  *H04W 52/14* (2009.01)
  *H04W 52/24* (2009.01)
(52) U.S. Cl.
  CPC ......... *H04W52/244* (2013.01); *H04W 72/0406* (2013.01); *H04W 72/0473* (2013.01)

(56) References Cited

U.S. PATENT DOCUMENTS

| | | | |
|---|---|---|---|
| 2010/0142503 A1* | 6/2010 | Kubler et al. | 370/338 |
| 2012/0269186 A1* | 10/2012 | Kubler et al. | 370/352 |
| 2013/0195040 A1* | 8/2013 | Sanderford et al. | 370/329 |

FOREIGN PATENT DOCUMENTS

| | | | |
|---|---|---|---|
| EP | 1720264 | A1 | 11/2006 |
| JP | 10-145842 | A | 5/1998 |
| JP | 2002-204478 | A | 7/2002 |
| JP | 2003-037555 | A | 2/2003 |
| JP | 20104187 | A | 1/2010 |
| WO | 2010002991 | A1 | 1/2010 |
| WO | 2010016123 | A1 | 2/2010 |

OTHER PUBLICATIONS

Communication dated Jun. 5, 2014, issued by the European Patent Office in corresponding Application No. 09823434.7.

* cited by examiner

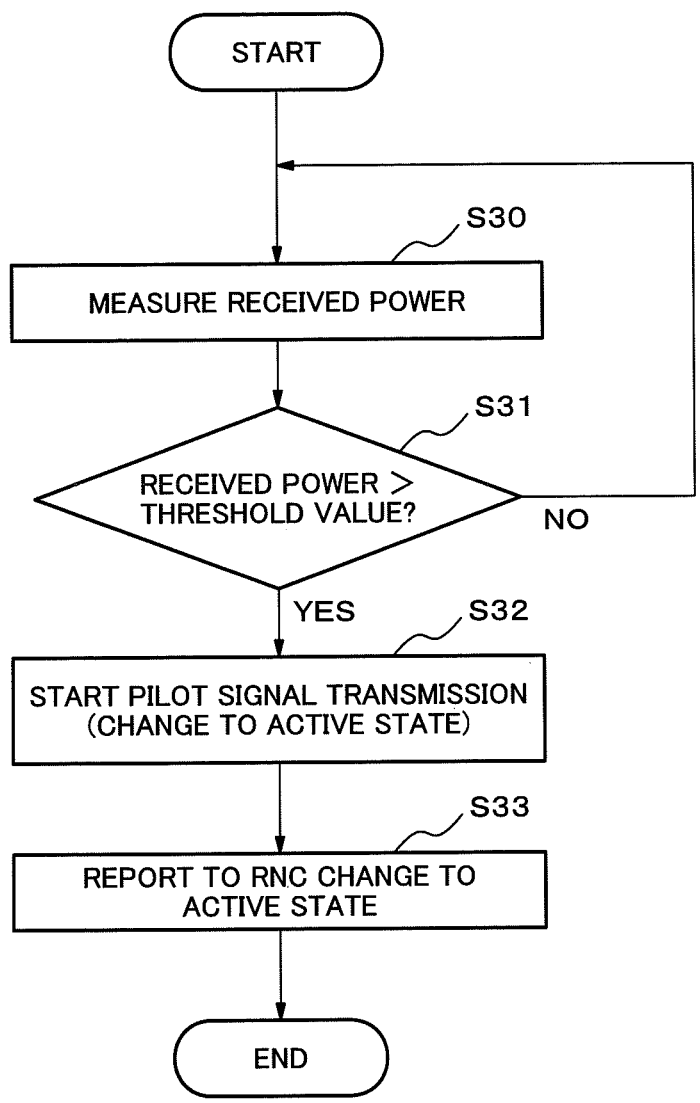

PERIOD OF RECEIVED
POWER MEASUREMENT ON

BASE STATION, RADIO COMMUNICATIONS SYSTEM, CONTROL METHOD OF BASE STATION, RADIO COMMUNICATIONS METHOD AND CONTROL PROGRAM

CROSS REFERENCE TO RELATED APPLICATIONS

This application is a National Stage of International Application No. PCT/JP2009/066579 filed Sep. 15, 2009, claiming priority based on Japanese Patent Application No. 2008-276028 filed Oct. 27, 2008, the contents of all of which are incorporated herein by reference in their entirety.

TECHNICAL FIELD

The present invention relates to a base station, a radio communications system, a control method of a base station, a radio communications method and a control program.

BACKGROUND ART

As a mobile communications system, for example, a cellular system is known. A cellular system is a system to secure a communication range of a service area for a wide range by laying out cells (communication area of base stations which cover from several hundreds meters to several kilometers). By the way, in case of a cellular system, in order to avoid the situation where communication is impossible due to dark place or an increase of number of terminals in a service area, countermeasures which increase the number of the base stations are being performed. In that case, there are variously arrangement patterns of the base stations (for example, a case where a cover area of a certain cell overlaps with a cover area of a cell which is adjacent to the certain cell, a case where entire cover area of the certain cell is included in a cover area of other cell, and a case where each cover area of three or more cells overlaps).

However, the overlap and the inclusion of the cover area might cause the generation of radio wave interference between the base stations. Radio interference brings about lowering of channel capacity. Also, with an increase of number of base stations, in spite of the fact that a mobile station does not exist in a cover area of the cell (that is, in spite of not being used at all), probability rises that a base station which is kept started exists. Electric power is wasted by a base station which is being started wastefully and without being used at all.

Accordingly, technologies aiming at interference avoidance or power savings in a mobile communications system are proposed. For example, Japanese Patent Application Laid-Open No. 2003-37555 describes a technology in which a radio base station monitors a transmission signal transmitted from other radio base stations, and by considering traffic status and received power of other radio base stations, suspends transmission or starts transmission of own base station. The bulletin mentions that the number of base stations operating in light traffic and the interference in surrounding base stations are decreased.

DISCLOSURE OF THE INVENTION

Problems to be Solved by the Invention

In case of the bulletin mentioned above, own base station is returned from the sleep state to the normal state only on the condition that traffic of an adjacent base station becomes heavy traffic. In case of a radio communications system in which there is only one base station adjacent to a predetermined base station, there are no problems in particular in the technology of the publicity mentioned above. However, in case of a general radio communications system represented by a cellular system, there are usually a plurality of base stations adjacent to a predetermined base station. In case the technology of the bulletin mentioned above is applied to such the system, and in case heavy traffic is imposed on a predetermined base station, all adjacent base stations adjacent to the base station are to be started. However, probability that a position of each mobile station exists uniformly in a cover area of each of those adjacent base stations which are started is very low, and usually, possibility that they are unevenly distributed in a cover area of a specific base station is high. Accordingly, among adjacent base stations which have been started, possibility rises that a base station exists which, as whose distance with a mobile station is far, cannot communicate or cannot secure enough communication quality even if it can communicate. That is, such a base station can be said as a base station which does not contribute almost or at all to traffic reduction of the predetermined base station, and so to speak, which is started wastefully. That is, the technology disclosed by the bulletin mentioned above cannot reduce sufficiently the number of base stations which have been started wastefully in spite of the light traffic state, and as a result, cannot reduce sufficiently interference between the adjacent cells nor power consumption.

An object of the present invention is to provide a base station, a radio communications system, a control method of a base station, a radio communications method and a control program capable of suppressing consumption of electric power of a base station and avoiding radio interference between base stations.

Measures for Solving the Problems

A base station of the present invention receives a transmission signal from a mobile station to other base station and starts transmission of a control signal with predetermined power depending on a reception condition of the transmission signal.

Also, a radio communications system of the present invention includes a first base station, a second base station, and at least one mobile station which can communicate with the first base station and the second base station. The second base station receives a transmission signal from the mobile station to the first base station and starts transmission of a control signal with predetermined power depending on a reception condition of the transmission signal.

Also, a control method of a base station of the present invention includes the steps of receiving a transmission signal from a mobile station to other base station, and starting transmission of a control signal with predetermined power depending on a reception condition of the transmission signal.

Also, a radio communications method of a radio communications system including a first base station, a second base station, and at least one mobile station which can communicate with the first base station and the second base station of the present invention includes the steps of receiving a transmission signal from the mobile station to the first base station, and starting transmission of a control signal with predetermined power depending on a reception condition of the transmission signal.

Also, a control program of the present invention makes computer of base station execute processing to receive a transmission signal from a mobile station to other base station, and to start transmission of a control signal with predetermined power depending on a reception condition of the transmission signal.

Also, a mobile station which is able to communicate with a first base station and a second base station of the present invention transmits a transmission signal from the mobile station to the first base station, and receives a control signal transmitted from the second base station with predetermined power depending on a reception condition of the transmission signal in the second base station.

Effect of the Invention

According to the present invention, consumption of electric power of a base station is suppressed and radio interference between base stations is avoided.

BRIEF DESCRIPTION OF THE DRAWINGS

[FIG. 8] A flow chart showing an example of operation of the second base station in case of, in the first exemplary embodiment, changing from the radio transmission suspension state to the active state

Figure 1:
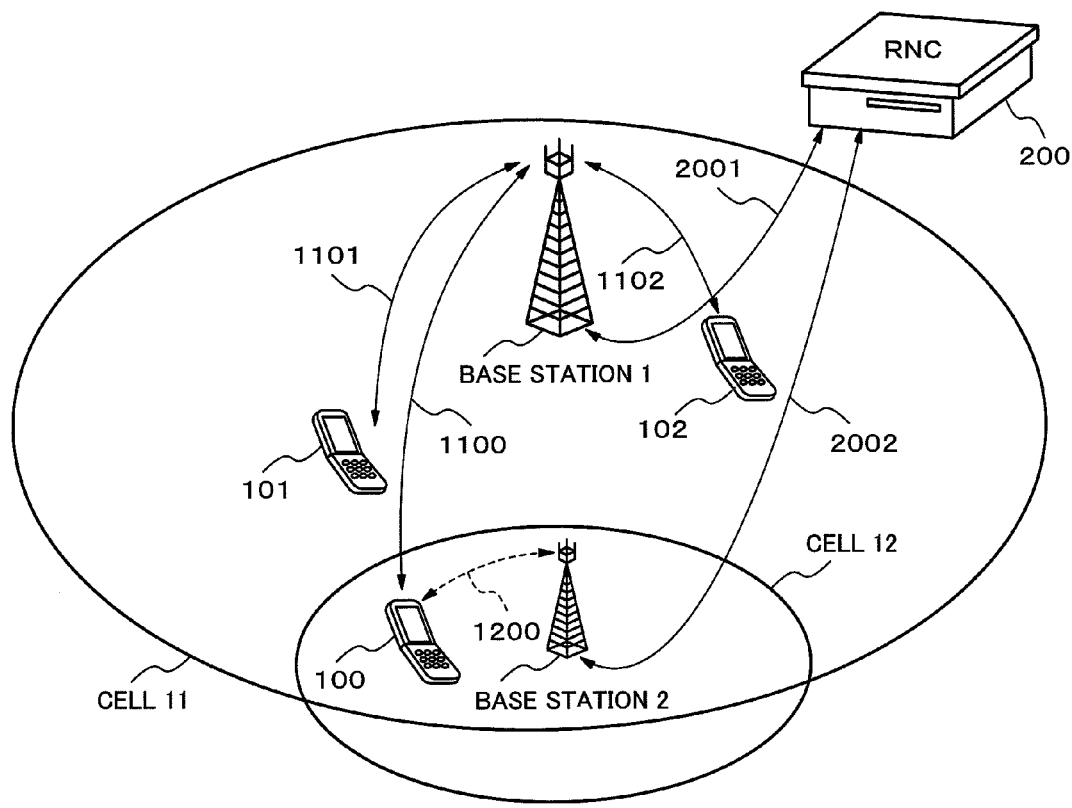
[FIG. 1] A block diagram showing an example of a radio communications system according to the first exemplary embodiment of the present invention

DESCRIPTION OF CODE 1-6 Base station
11, 12 Cell of base station
100-102 Mobile station
200 RNC
358 State change control unit
360 Power control unit
364 Mobile station signal estimation unit
400 Load management unit
450 Measurement management unit
500 Calling signal detection unit
502 Detection management unit
600 Code judgment unit
602 Judgment management unit Exemplary Embodiments Of The Invention In the following, exemplary embodiments of the present invention are described in detail with reference to drawings.

A base station according to an exemplary embodiment of the present invention receives a transmission signal from a mobile station to other base station, and starts transmission of a control signal with predetermined power depending on a reception condition of the transmission signal concerned. More specifically, the mobile station receives the control signal which other base station transmits, replies to the control signal and transmits a signal to the other base station. And the base station mentioned above receives a signal transmitted from the mobile station to the other base station, and starts transmission of a control signal (for example a common control signal) which will be broadcasted to the entire cells on the occasion when the received power is no smaller than a predetermined threshold value. Hereinafter, a plurality of exemplary embodiments of the present invention is described specifically. Further, in each of the following exemplary embodiments, a case where a "pilot signal" which is a common control signal transmitting a signal of a predetermined pattern continually and repeatedly is employed as an example of the "control signal" is described.

[First Exemplary Embodiment]

FIG. 1 is a block diagram showing an example of a radio communications system according to the first exemplary embodiment of the present invention. This radio communications system includes a base station 1 (a first base station), a base station 2 (a second base station), a mobile stations 100-102 and a Radio Network Controller 200 (hereinafter, referred to as "RNC"). The base station 1 transmits the pilot signal to the mobile station in a cell 11. The mobile stations 100-102 which received the pilot signal communicate with the base station 1 through radio links 1100-1102 respectively based on the pilot signal received. Similarly, the base station 2 can transmit the pilot signal to the mobile station in a cell 12. The mobile station 100 which received the pilot signal can form a radio link 1200 and communicate with the base station 2. Here, a part at least overlaps between the cell 11 and the cell 12. The RNC 200 is connected with the base station 1 through a line 2001. The RNC 200 is also connected with the base station 2 through a line 2002. The RNC 200 manages the base station 1 and the base station 2. Here, the line 2001 and the line 2002 may be either a cable line or a wireless line, and are described as the cable line in the following description.

Figure 2:
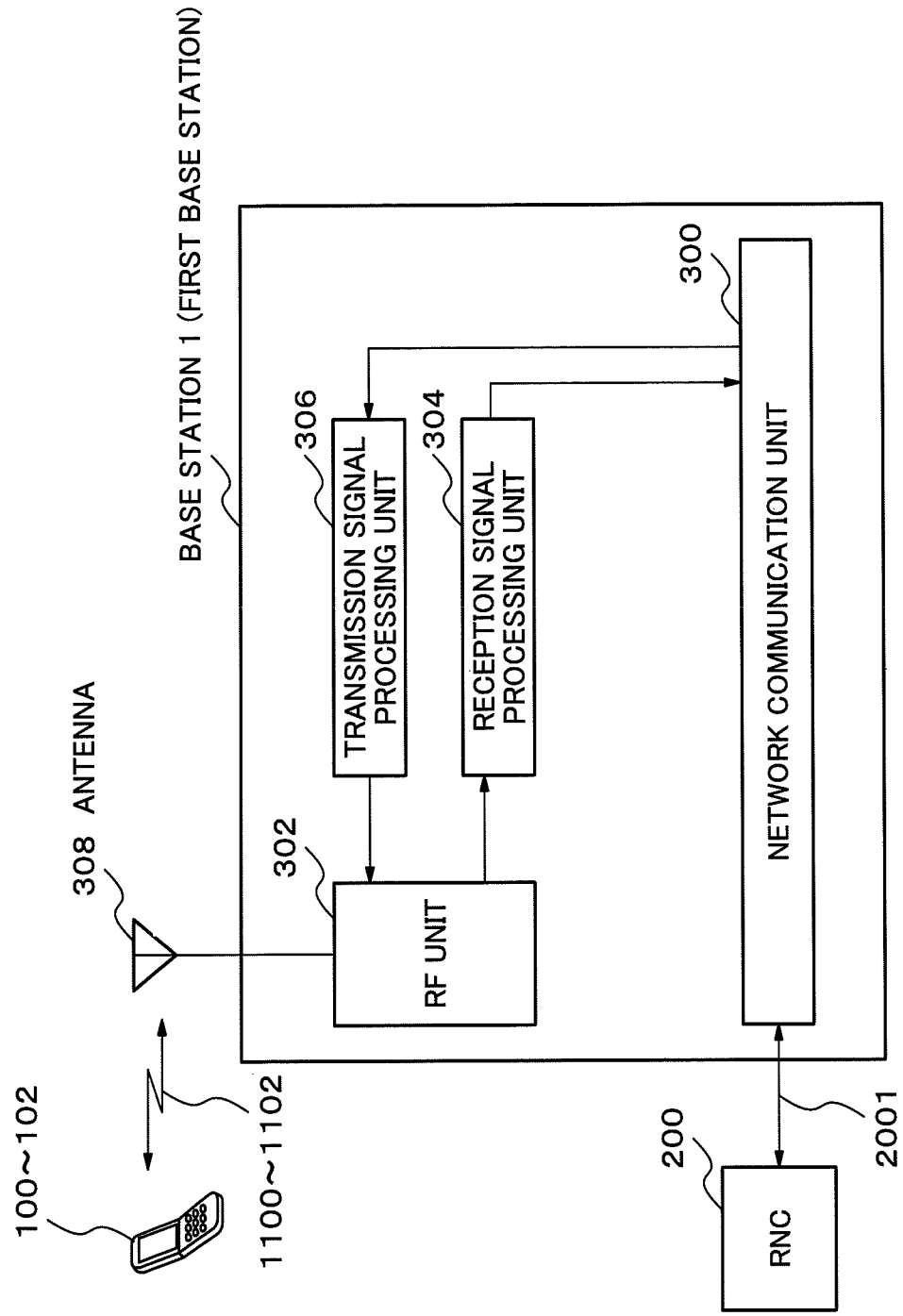
[FIG. 2] block diagram showing an example of a first base station in the first exemplary embodiment

FIG. 2 is a block diagram showing an example of the base station 1 as the first base station shown in FIG. 1. The base station 1 includes a network communication unit 300, a RF (Radio Frequency) unit 302, a reception signal processing unit 304, a transmission signal processing unit 306 and an antenna 308. The network communication unit 300 performs communication with the RNC 200 through the line 2001. The RF unit 302 performs communication with each of the mobile stations 100-102 through the radio links 1100-1102. The reception signal processing unit 304 processes a signal that the RF unit 302 received from the mobile stations 100-102. The transmission signal processing unit 306 processes a signal for transmitting to the mobile stations 100-102 and outputs the processed signal to the RF unit 302. The antenna 308 radiates a radio wave into space, or captures a radio wave which propagated within space in order to perform radio communication with the mobile stations 100-102.

Figure 3:
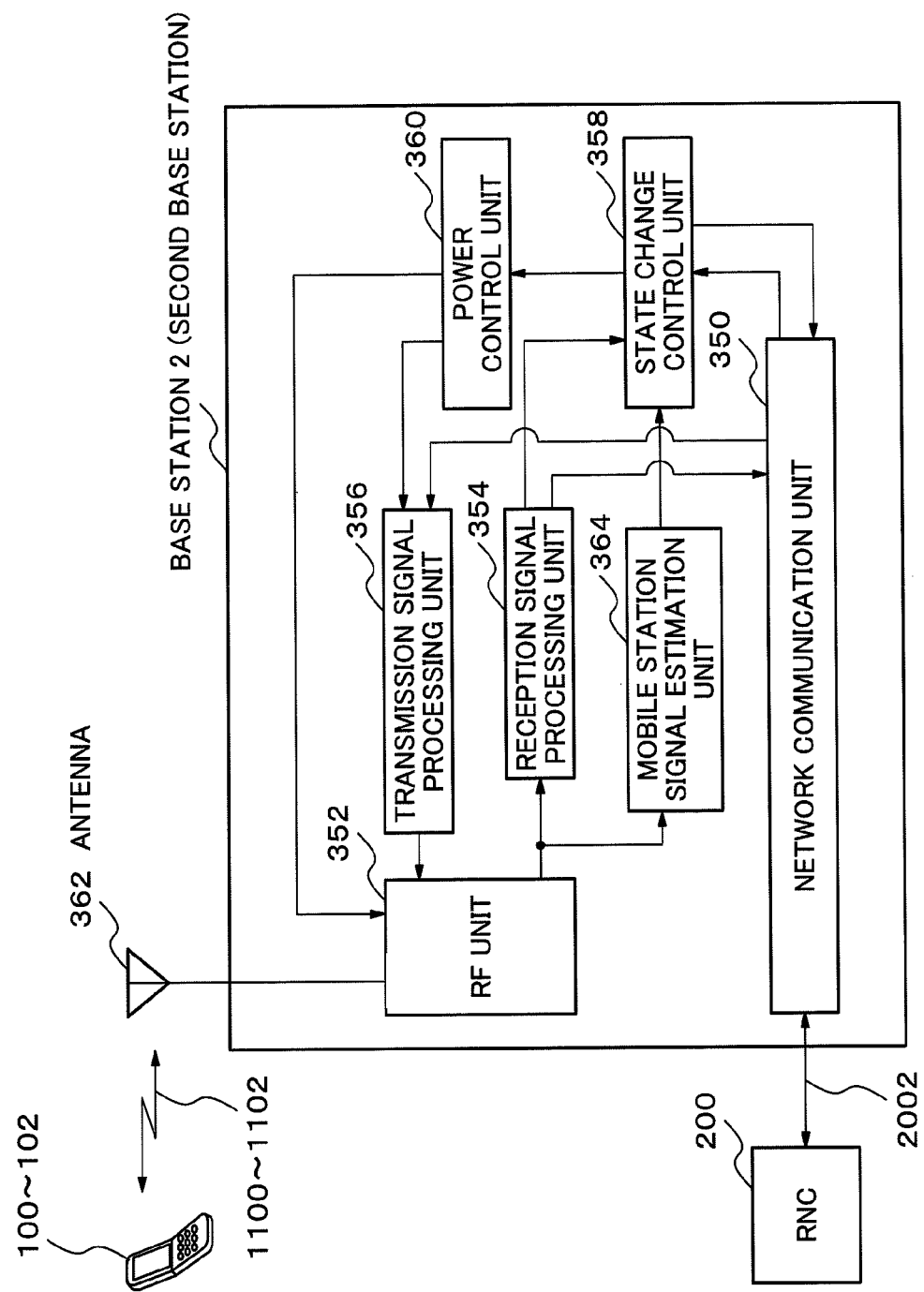
[FIG. 3] A block diagram showing an example of a second base station in the first exemplary embodiment

FIG. 3 is a block diagram showing an example of the base station 2 as the second base station shown in FIG. 1. The base station 2 includes a network communication unit 350, a RF unit 352, a reception signal processing unit 354, a transmission signal processing unit 356, a state change control unit 358, a power control unit 360, an antenna 362 and a mobile station signal estimation unit 364. The network communication unit 350 performs communication with the RNC 200 through the line 2002. The RF unit 352 performs communication with the mobile stations 100-102 through the radio link. The reception signal processing unit 354 processes a signal which the RF unit 352 received from the mobile stations 100-102. The transmission signal processing unit 356 processes a signal for transmitting to the mobile stations 100-102 and outputs the processed signal to the RF unit 352. The antenna 362 radiates a radio wave into space, or captures a radio wave which propagated within space in order to perform radio communication with the mobile stations 100-102.

The state change control unit 358 controls state change of the base station 2 based on information or directions from the network communication unit 350, the reception signal processing unit 354 or the mobile station signal estimation unit 364. The power control unit 360 carries out, based on a command from the state change control unit 358, on/off of a power supply of the transmission signal processing unit 356 and control of transmission power of the RF unit 352 and control of on/off of its power supply.

The mobile station signal estimation unit 364 detects a transmission signal of surrounding mobile stations 100-102 from a signal (radio wave, for example) received from the RF unit 352, in case base station 2 performs in an active state, as mentioned later, a procedure to change to a radio transmission suspension state and in case it is in the radio transmission suspension state. As an example of detection method of a transmission signal, for example, there is a method to detect a signal from received power.

Figure 4:
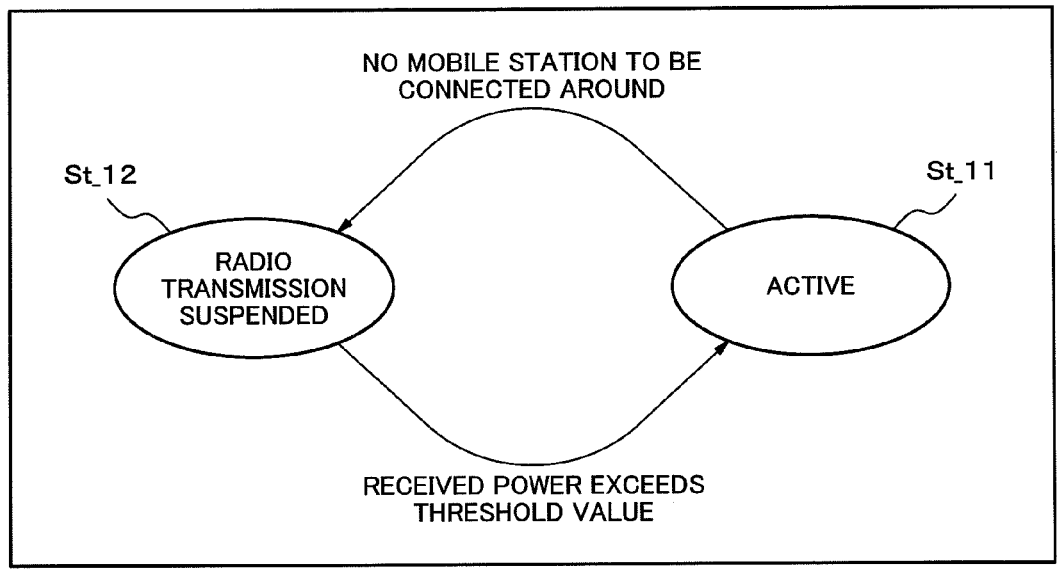
[FIG. 4] An explanatory drawing about state change of the second base station

FIG. 4 is an explanatory drawing about state change of the base station 2 as the second base station. The base station 2 has two operation states as shown in FIG. 4. The first operation state is an active state St_11 in which the base station 2 can transmit and receive a radio signal with a mobile station (in FIG. 1, the mobile station 100, for example) which resides in the cell 12. The second operation state is a radio transmission suspension state St_12 in which, by suspending radio transmission from the base station 2, radio communication with a mobile station in the cell 12 is made impossible, and surrounding noise power is measured.

The base station 2 makes, for example, whenever a condition as shown in FIG. 4 is satisfied, the operation state change from one to the other. A condition on which the base station 2 changes from the active state St_11 to the radio transmission suspension state St_12 is, for example, a case when communication of the mobile station 100 in the base station 2 is disconnected, and a mobile station which connects with the base station 2 does not exist any more. A condition to change from the radio transmission suspension state St_12 to the active state St_11 is, for example, a case when, by the mobile station signal estimation unit 364 of the base station 2, received power of a transmission signal of the mobile station 100 to the base station 1 in the base station 2 is judged to be higher than a threshold value.

Further, "to suspend radio transmission from the base station 2" in the radio transmission suspension state St_12 means, specifically, for example, a state in which a power supply or a transmission function of the transmission signal processing unit 356 or the RF unit 352 are turned off by the power control unit 360 of the base station 2, and transmission from the base station 2 to the mobile station 100 is suspended.

Figure 5:
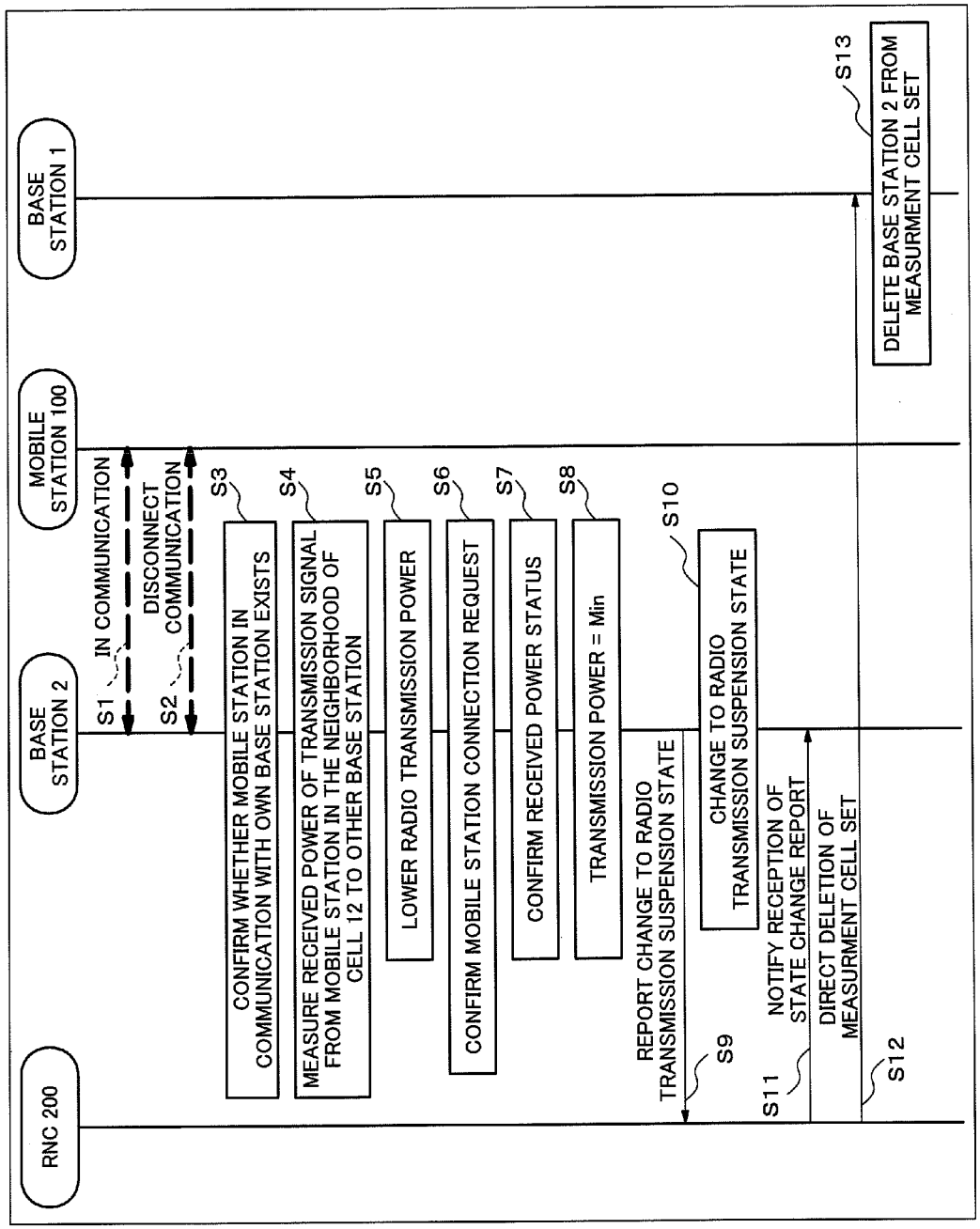
[FIG. 5] A sequence chart showing an example of operation of the radio communications system on the occasion when the second base station changes from an active state to a radio transmission suspension state

FIG. 5 is a sequence chart showing an example of operation of the radio communications system on the occasion when the base station 2 as the second base station changes from the active state St_11 to the radio transmission suspension state St_12. Hereinafter, sequence described in FIG. 5 will be explained with reference to FIGS. 1-3 as necessary.

Firstly, the base station 2 is in communication with the mobile station 100 in the cell 12 (Step S1). Here, by a certain reason, the mobile station 100 carries out communication disconnect processing to the base station 2 (Step S2). The base station 2 which received the communication disconnect request from the mobile station 100 confirms whether a mobile station in communication exists other than the mobile station 100 in the cell 12 of own base station (Step S3).

In case it is confirmed that a mobile station in communication does not exist other than the mobile station 100, the base station 2 performs measurement of received power of a transmission signal from a mobile station (the mobile stations 101 and 102 in FIG. 1, for example) in the neighborhood of the cell 12 to other base station 1 and performs comparison with a threshold value prescribed in advance (Step S4). In case the received power does not exceed the threshold value and fixed time (5 seconds, for example) has passed, the base station 2 lowers transmission power gradually (for example, 1 dB per 0.1 second) (Step S5).

While lowering transmission power, the base station 2 confirms whether there is a new connection request from a mobile station in the cell 12 of own base station (Step S6). Also, the base station 2 confirms whether received power of a transmission signal of a mobile station to other base station exceeds the threshold value (Step S7). In case there are no new connection requests and the received power is lower than the threshold value, the base station 2 performs processing from Step S5 to Step S7 repeatedly until transmission power goes down for fixed quantity (20 dB, for example) (that is, until transmission power becomes 1/100 of power in the active state St_11).

In case transmission power goes below the predetermined threshold value (Step S8), the base station 2 reports to the RNC 200 to the effect that the base station 2 changes to the radio transmission suspension state St_12 (Step S9). And the base station 2 which transmitted the state change report suspends radio transmission to a mobile station and changes to the radio transmission suspension state St_12 (Step S10). The RNC 200 which received the report concerned transmits a notification to the base station 2 to the effect that the state report of the base station 2 was received by the RNC 200 (Step S11). Also, The RNC 200 directs the base station 1 to delete the base station 2 from a measurement cell set (Step 12). Here, the measurement cell set is a list of cells (base station) which become a target for which a mobile station performs measurement of received power of the pilot signal. And the base station 1 which received the direction concerned updates the measurement cell set of the base station 1 and deletes the base station 2 (Step S13).

Figure 6:
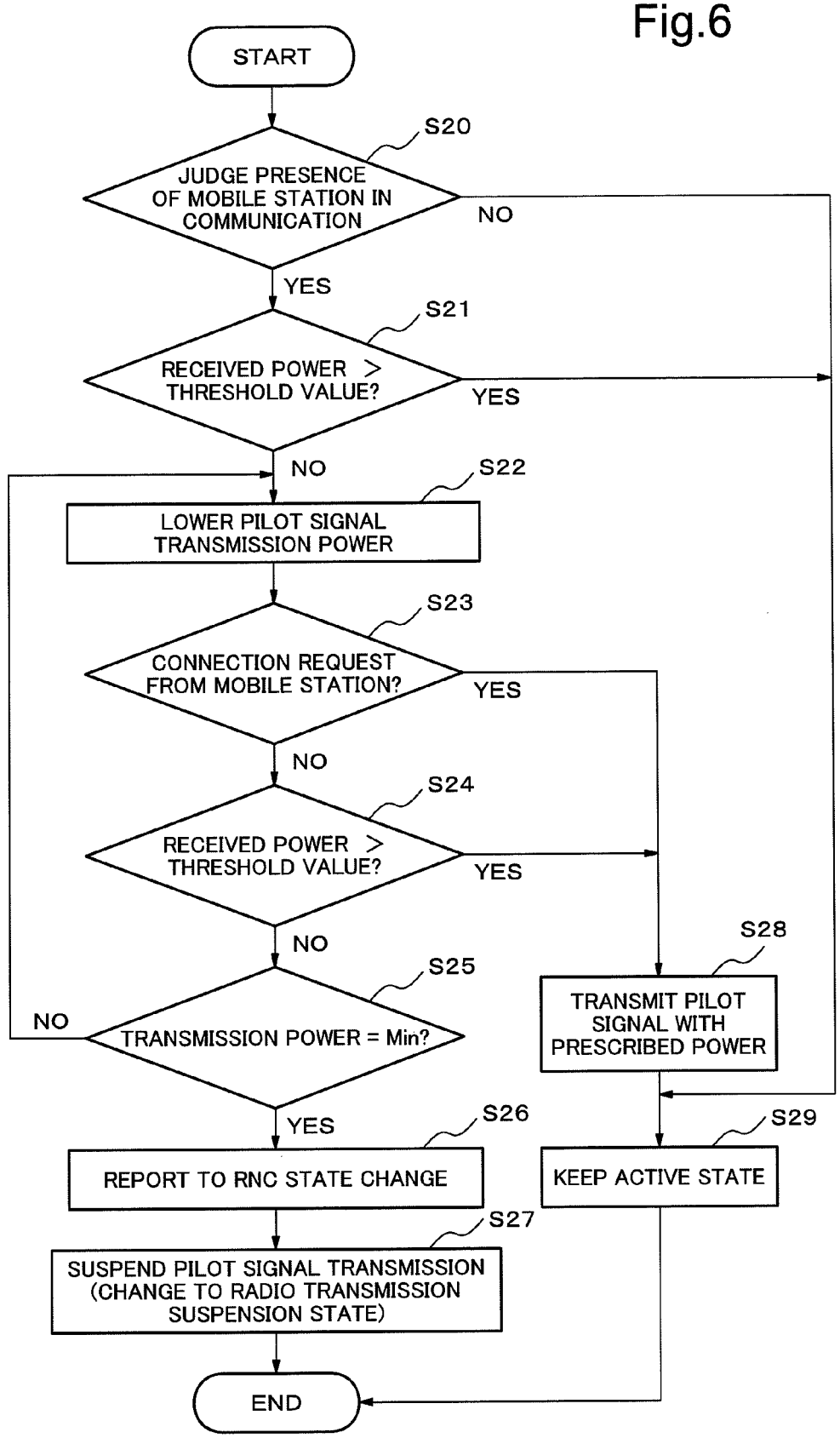
[FIG. 6] A flow chart illustrating an example of operation of the second base station in case of changing from the active state to the radio transmission suspension state

FIG. 6 is a flow chart illustrating an example of operation of the base station 2 as the second base station in case of changing from the active state St_11 to the radio transmission suspension state St_12. Processing indicated in the flow concerned is carried out in case either of the next two conditions is satisfied. The first condition (1) is, when communication of the mobile station 100 in communication in the cell 12 ended (in other words, in case a mobile station which communicates with the base station 2 does not exist any more). The second condition (2) is, after communication is handed over to an adjacent base station when the mobile station 100 goes outside of the cell 12, when received power of a transmission signal of the mobile station 100 to other base station in the base station 2 goes below a threshold value and fixed time has passed.

When either of the conditions (1) and (2) mentioned above is satisfied, the reception signal processing unit 354 of the base station 2 judges a presence of a mobile station in communication with the base station 2,(whether number of a mobile station is 0, or whether communication traffic is 0) (Step S20). In case a mobile station in communication with the base station 2 is judged by the reception signal processing unit 354 "exist" (in case judged as No in Step S20), the state change control unit 358 keeps an operation state of the base station 2 in the active state St_11 (Step S29). As a result, the state change control unit 358 directs the power control unit 360 to keep transmission power in a usual operation state, and an active state which is a usual communication state is kept.

In case a mobile station in communication is judged "not exist" (in case judged as Yes in Step S20), the mobile station signal estimation unit 364 measures received power of a transmission signal of a mobile station which exists around the cell 12 to other base station and compares the above received power with a threshold value (Step S21). In case the received power concerned exceeds the threshold value (in case judged as Yes in Step S21), the mobile station signal estimation unit 364 outputs the notification to the state change control unit 358. As a result, the state change control unit 358 keeps an operation state of the base station 2 in the active state St_11 (Step S29). On the other hand, in case the received power is lower than the threshold value (in case judged as No in Step S21), the mobile station signal estimation unit 364 outputs the notification to the state change control unit 358. As a result, the state shift control unit 358 issues a direction to the power control unit 360 to lower gradually transmission power of the control signal including the pilot signal. The power control unit 360 which received the direction to lower transmission power outputs a direction to lower gradually transmission power of the transmission signal processing unit 356 (Step S22). Here, for example, the power control unit 360 lowers transmission power of the transmission signal processing unit 356, for example, 1 dB per 0.1 second, and stops lowering processing of transmission power until it falls 20 dB (that is, until transmission power becomes 1/100 of power in the active state St_11).

While the transmission signal processing unit 356 lowers transmission power by control of the power control unit 360, the reception signal processing unit 354 confirms whether a new connection request from a mobile station in the cell 12 of own base station exists (Step S23). At the same time, the mobile station signal estimation unit 364 confirms whether received power of a transmission signal of a mobile station to other base station exceeds a threshold value (Step S24).

Processing of a case is described in which, while lowering transmission power, there is a new connection request from a mobile station in the cell 12 (in case judged as Yes in Step S23) or received power of a transmission signal of a mobile station to other base station in the base station 2 exceeds a threshold value (in case judged as Yes in Step S24). In this case, at least one of the reception signal processing unit 354 and the mobile station signal estimation unit 364 outputs to the state change control unit 358 control information or a direction to raise transmission power to a prescribed value. By this control information or the direction, the state change control unit 358 issues a direction to the power control unit 360 to raise transmission power of the control signal including the pilot signal of the transmission signal processing unit 356 to the prescribed value. As a result, the power control unit 360 controls the transmission signal processing unit 356, to raise transmission power (Step S28), and to keep an operation state of the base station 2 in the active state St_11 (Step S29).

Processing of a case is described in which, while lowering transmission power, there are no new connection requests from a mobile station in the cell 12 (in case judged as No in Step S23) and received power of a transmission signal of a mobile station to other base station in the base station 2 is lower than a threshold value (in case judged as No in Step S24). In this case, the transmission signal processing unit 356 decides whether transmission power is lowered to a predetermined threshold value (Step S25). At the time when it is lowered to the threshold value (in case judged as Yes in Step S25), the transmission signal processing unit 356 notifies the state change control unit 358 and further, the state change control unit 358 reports to the RNC 200 via the network communication unit 350 to the effect that the base station 2 changes to the radio transmission suspension state St_12 (Step S26). After reporting state change to the RNC 200, the state change control unit 358 issues a direction to the power control unit 360 to suspend the pilot signal of the transmission signal processing unit 356 (Step S27). As a result, an operation state of the base station 2 becomes the radio transmission suspension state St_12.

Further, transmission power lowering processing of the base station 2 is not limited to the above. For example, the power control unit 360 or the transmission signal processing unit 356 of the base station 2 can also lower transmission power to a predetermined value not gradually but quickly. In that case, at least processing of Step S23, and depending on the case, processing of Step S24 in FIG. 6 can also be omitted. Here, "predetermined value" mentioned above includes a state when a signal is not outputted at all, that is, power "0" ("0" watt, for example).

Next, a case in which the base station 2 changes from the radio transmission suspension state St_12 to the active state St_11 is described.

The base station 2 in the radio transmission suspension state St_12 judges whether a mobile station in communication exists around the base station 2 by measuring received power of a transmission signal from the mobile station 100 to the base station 1 in upstream band (band used by signal transmission from a mobile station to a base station). The base station 2 in the radio transmission suspension state St_12 changes an operation state of the base station 2 from the radio transmission suspension state St_12 to the active state St_11 depending on the judgment result.

Here, referring to FIG. 1 again, in order to perform communication with the base station 1, each of the mobile stations 100-102 receives the pilot signal of the base station 1 respectively, transmits a radio wave based on that, and forms each radio link 1100-1102.

Figure 7A:
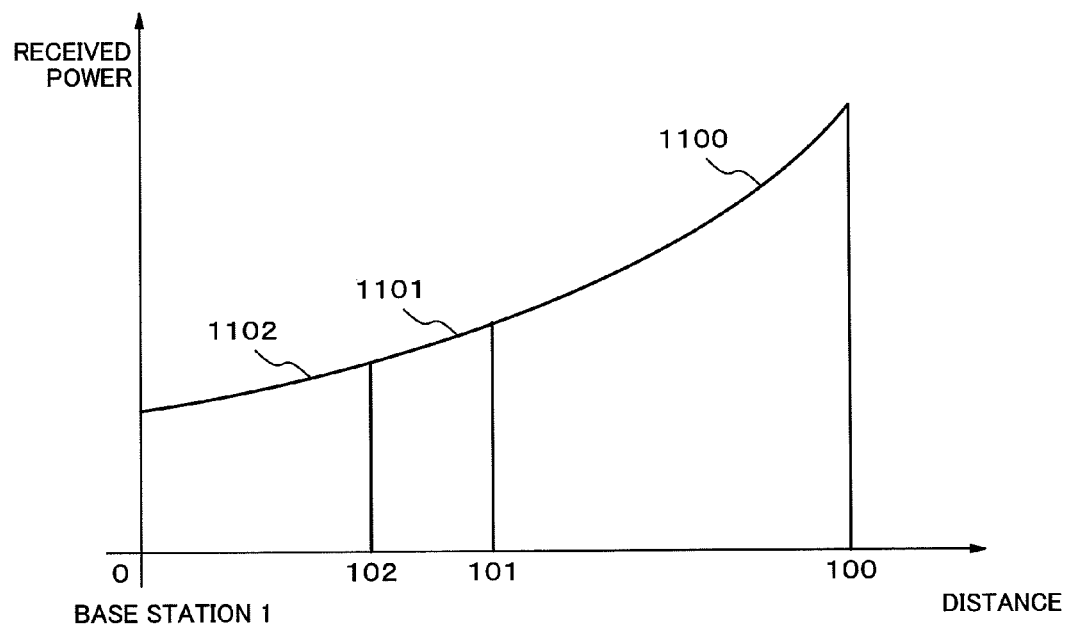
[FIG. 7A] A graph showing relation between the distance of each mobile station from the first base station and the received power at the first base station

FIG. 7A is a graph showing relation between the distance of each mobile station from the base station 1 and received power at the base station 1 of a transmission signal from each mobile station to the base station 1. At that time, each of the mobile stations 100-102 controls transmission power so that received power in the base station 1 may become uniform. For example, the mobile station 100 which exists at a far location from the base station 1 transmits a signal with larger power than the mobile station 101 and the mobile station 102 which are located nearby. By the way, a signal transmitted from a mobile station to a base station is an omnidirectional signal. Accordingly, for example, the base station 2 can receive a signal (in FIG. 1, the signal 1100) which the mobile station 100 transmitted to communicate originally with the base station 1. In this case, a signal that the base station 2 can receive is not limited to a transmission signal from the mobile station 100 and also includes a transmission signal from other mobile station 101 and mobile station 102. Thus, reception of radio wave from surrounding mobile stations (in case of FIG. 1, the mobile stations 100, 101 and 102), in case the base station 2 is in a radio transmission suspension state, is carried out by the mobile station signal estimation unit 364 of the base station 2.

Figure 7B:
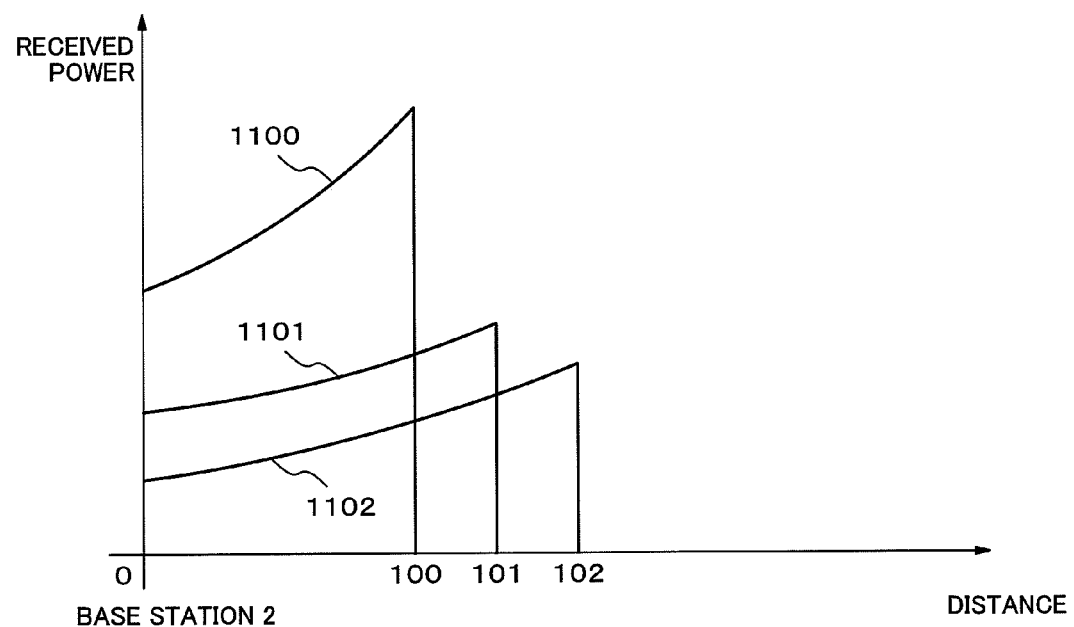
[FIG. 7B] A graph showing relation between the distance of each mobile station from the second base station and the received power at the second base station

FIG. 7B is a graph showing relation between the distance of each mobile station from the base station 2 and received power at the base station 2 of a transmission signal from each mobile station to the base station 1. In this case, from FIG. 1 and FIG. 7B, for example, in the base station 2, it is understood that received power of a signal from the mobile station 100 closest to the base station 2 is largest.

The mobile station signal estimation unit 364 of the base station 2 measures received power of radio wave from surrounding mobile stations, compares the measured received power value with a predetermined threshold value, and in case the received power is larger than the threshold value, decides that a mobile station in communication exists around the base station 2. Here, this threshold value is a threshold value for deciding whether measured received power value is at a level which can be acknowledged that a mobile station in communication exists in the neighborhood of the base station 2. The base station 2 changes to the active state St_11 and starts transmission of the pilot signal with predetermined power according to the decision result of the mobile station signal estimation unit 364. The Base station 2 reports to the RNC 200 that the base station 2 changed to the active state St_11. The RNC 200 which received the report concerned directs the base station 1 to add the base station 2 to a measurement cell set. The base station 1 which received the addition direction concerned directs a mobile station in connection to measure received power of the pilot signal including a cell added to the measurement cell set, and the mobile station measures received power of the pilot signal following the direction.

FIG. 8 is a flow chart showing an example of operation of the base station 2 as the second base station in case of changing from the radio transmission suspension state St_12 to the active state St_11. It is when the base station 2 changes to the radio transmission suspension state St_12 that processing indicated in the aspect flow is called in the base station 2.

The mobile station signal estimation unit 364 of the base station 2 in the radio transmission suspension state St_12 performs based on a signal from the RF unit 352, as described above, received power measurement of radio wave from surrounding mobile stations (Step S30). The mobile station signal estimation unit 364 judges whether the measured received power value is larger than a predetermined threshold value (Step S31). In case the received power is less than the threshold value, the mobile station signal estimation unit 364 continues measurement of the received power. In case the received power exceeds the threshold value, the mobile station signal estimation unit 364 decides that a mobile station in communication exists around the base station 2. Based on the decision result of the mobile station signal estimation unit 364, the state change control unit 358 makes an operation state of the base station 2 change to the active state St 11 and directs the power control unit 360 to start transmission of the pilot signal with predetermined power from the transmission signal processing unit 356 (Step S32). Also, the state change control unit 358 reports to the RNC 200 via the network communication unit 350 that the base station 2 changed to the active state St_11 (Step S33).

In a radio communications system according to the first exemplary embodiment described above, the base station 2 receives a transmission signal from a mobile station to other base station and starts transmission of the pilot signal with predetermined power depending on a reception condition of the transmission signal concerned. Specifically, the mobile station signal estimation unit 364 of the base station 2 measures received power, compares the measured received power value with a predetermined threshold value, and in case the received power is larger than the threshold value, decides that a mobile station in communication exists around the base station 2. And the base station 2 changes to the active state St_11 based on this decision result, and starts transmission of the pilot signal with predetermined power. That is, in case of this radio communications system, the base station 2 changes to the active state St_11 for the first time in case there exists a mobile station which can, while in communication with other base station at present, communicate with own base station with certainty, and starts transmission of the pilot signal with predetermined power.

Therefore, it is possible to eliminate a base station which is started wastefully like Japanese Patent Application Laid-Open No. 2003-37555 in spite of the fact that a mobile station which can communicate does not exist, and as a result, with more certainty, it becomes possible to suppress consumption of electric power of a base station and avoid radio interference between base stations.

Here, the base station 2 of a radio communications system according to the first exemplary embodiment can, after changing to the active state St_11 and in case a predetermined condition is satisfied, carry out processing which returns an operation state of the base station 2 from the active state St_11 to the radio transmission suspension state St_12. In the above, realization of the predetermined condition is, for example, in case a mobile station which communicates with the base station 2 does not exist any more, or in case received power of the pilot signal of the base station 2 in a mobile station is lower than a threshold value. That is, the base station 2 includes a means to suspend transmission of the pilot signal (the state change control means 358 and the power control unit 360, for example) after transmission of the pilot signal is started and in case the predetermined condition mentioned above is satisfied.

By performing more careful state change control as above, it becomes possible, with more certainty, to suppress consumption of electric power of a base station and avoid radio interference between base stations.

Second Exemplary Embodiment

Figure 9:
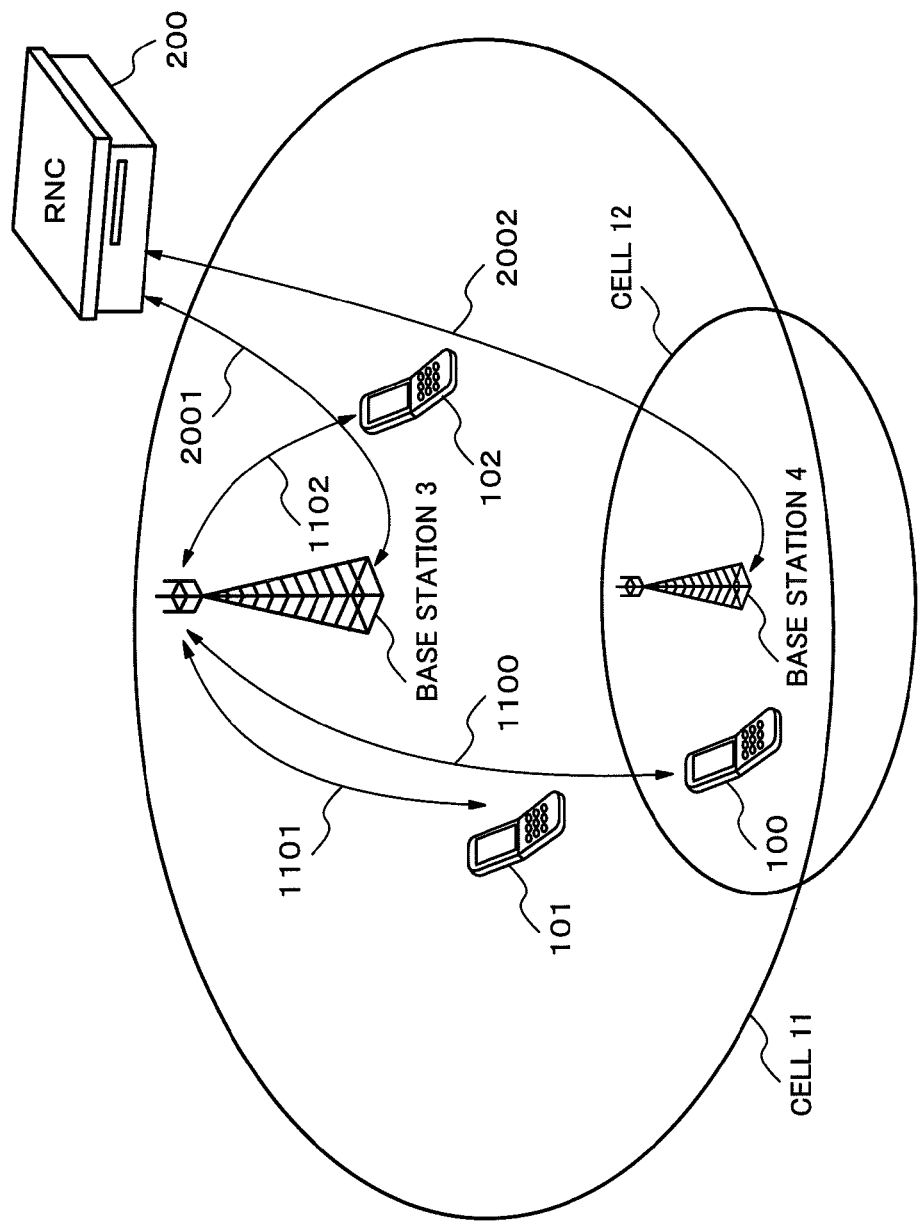
[FIG. 9] A block diagram showing an example of a radio communications system according to the second exemplary embodiment of the present invention

FIG. 9 is a block diagram showing an example of a radio communications system according to the second exemplary embodiment of the present invention. The entire structure of this radio communications system is identical with a radio communications system of the first exemplary embodiment shown in FIG. 1. The difference of the second exemplary embodiment from the first exemplary embodiment exists in each structure of a first base station and a second base station. Hereinafter, a base station equivalent to the first base station in a radio communications system of the second exemplary embodiment is newly referred to as a base station 3, and a base station equivalent to the second base station is newly referred to as a base station 4.

Figure 10:
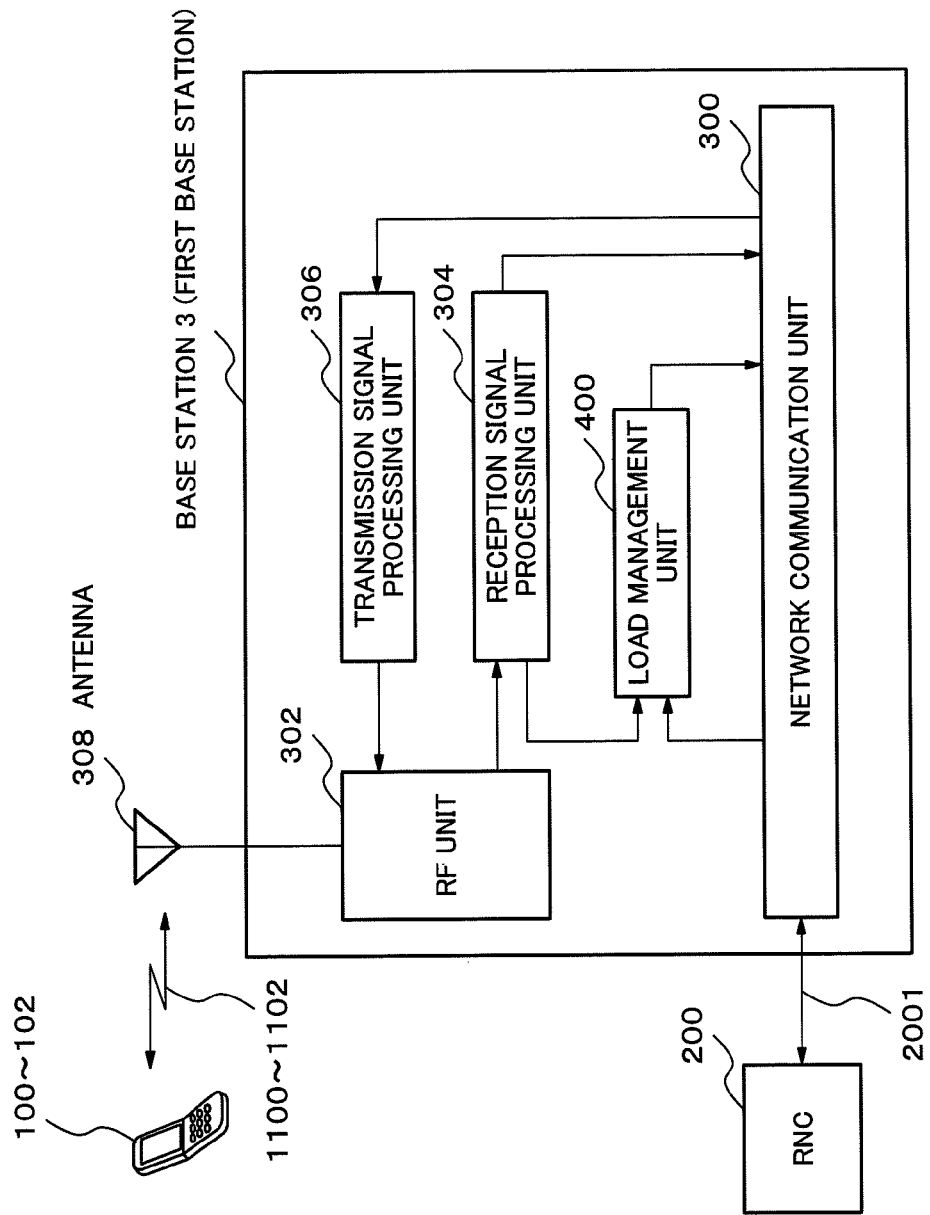
[FIG. 10] A block diagram showing an example of a first base station in the second exemplary embodiment

FIG. 10 is a block diagram showing an example of the base station 3 as the first base station of a radio communications system according to the second exemplary embodiment. The base station 3 further includes a load management unit 400 in addition to the structure of the base station 1 shown in FIG. 2. Because elements other than this load management unit 400 of the base station 3 are identical with the elements of the base station 1, their description will be omitted. The load management unit 400 acquires communication traffic of a mobile station which the base station 3 supports and number of mobile stations from the reception signal processing unit 304 and the transmission signal processing unit 306 as load data.

Figure 11:
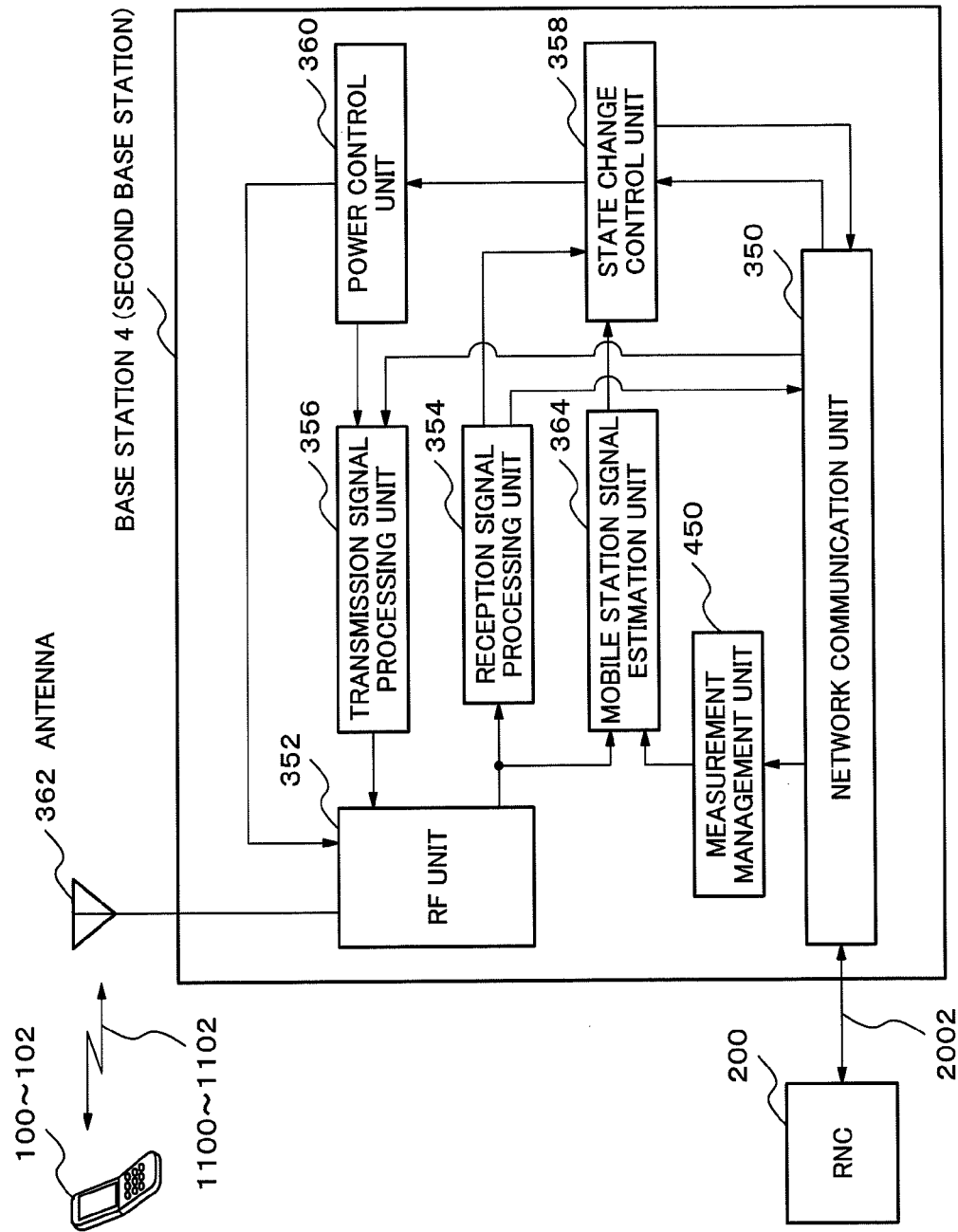
[FIG. 11] A block diagram showing an example of a second base station in the second exemplary embodiment

FIG. 11 is a block diagram showing an example of the base station 4 as the second base station of a radio communications system according to the second exemplary embodiment. The base station 4 further includes a measurement management unit 450 in addition to the structure of the base station 2 shown in FIG. 3. Because elements other than this measurement management unit 450 of the base station 4 are identical with the elements of the base station 2, their description will be omitted. The measurement management unit 450 receives load data of the base station 3 from the RNC 200, and the based on the load data concerned, determines whether to perform received power measurement of the mobile station signal estimation unit 364.

Further, in a radio communications system of this second exemplary embodiment and a radio communications system of the third and fourth exemplary embodiment described thereafter, operation sequence of a radio communications system, in case a second base station changes from the active state to the radio transmission suspension state, is the same as operation sequence of the radio communications system in the first exemplary embodiment (refer to FIG. 5). Also, in the radio communications system of this second exemplary embodiment and the radio communications system of the third and fourth exemplary embodiment described thereafter, an operation flow of the second base station in case of changing from the active state to the radio transmission suspension state is the same as the operation flow of the second base station (refer to FIG. 6). Accordingly, hereinafter, description about the operation sequence mentioned above and the operation flow mentioned above will be omitted. Also, in the radio communications system of this second exemplary embodiment and the radio communications system of the third and fourth exemplary embodiment described thereafter, because an operation flow in case a second base station changes from the radio transmission suspension state St_12 to the active state St_11 is also the same as the operation flow of the second base station in the first exemplary embodiment (refer to FIG. 8), hereinafter, its description will also be omitted.

Hereinafter, operation of a radio communications system of this exemplary embodiment in case the base station 4 as this second base station changes from the radio transmission suspension state St_12 to the active state St_11 is described.

Firstly, the base station 3 report to the RNC 200 number of mobile stations which own base station supports, or entire traffic, or both of them as load data. The RNC 200 transmits the load data of the base station 3 to the base station 4 in the radio transmission suspension state St_12. As a result, the network communication unit 350 of the base station 4 receives the load data and outputs it to the measurement management unit 450.

The measurement management unit 450 of the base station 4 compares the load data of the base station 3 with a predetermined threshold value. In case the load of the base station 3 is decided by the measurement management unit 450 to be lower than the predetermined threshold value, the base station 4 does not perform received power measurement. On the other hand, in case the load of the base station 3 is decided by the measurement management unit 450 to be higher than the predetermined threshold value, the base station 4 performs received power measurement of a transmission signal of a mobile station to other base station. In case received power measurement is performed, the measurement management unit 450 outputs a direction signal to the mobile station signal estimation unit 364. As a result, the mobile station signal estimation unit 364 which operates in the radio transmission suspension state judges whether the measured received power value is larger than a predetermined threshold value. In case the received power is less than the threshold value, the mobile station signal estimation unit 364 continues measurement of the received power. In case the received power exceeds the threshold value, the mobile station signal estimation unit 364 decides that a mobile station in communication exists around the base station 4. The base station 4 changes to active state St_12, and starts transmission of the pilot signal with predetermined power according to the decision result concerned of mobile station signal estimation unit 364. The base station 4 reports to the RNC 200 that the base station 4 changed to the active state St_11. The RNC 200 which received the report concerned directs the base station 3 to add the base station 4 to a measurement cell set. The base station 3 which received the addition direction concerned directs the mobile station in connection to measure received power of the pilot signal including a cell added to the measurement cell set, and the mobile station measures received power of the pilot signal following the direction.

Figure 12:
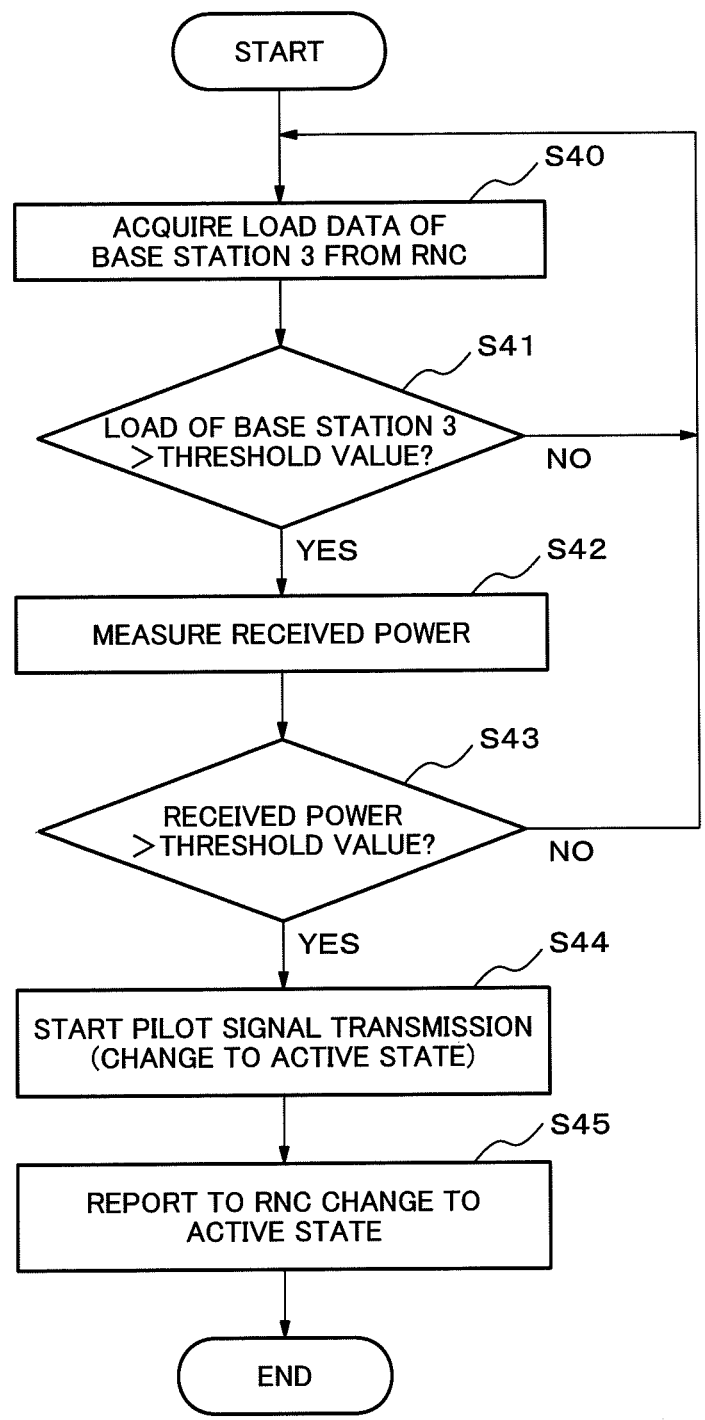
[FIG. 12] A flow chart showing an example of operation of the second base station in case of, in the second exemplary embodiment, changing from the radio transmission suspension state to the active state

FIG. 12 is a flow chart showing an example of operation of the base station 4 as the second base station in case of changing from the radio transmission suspension state St_12 to the active state St_11. It is when the base station 4 changes to the radio transmission suspension state St_12 that processing shown in the aspect flow is called in the base station 4.

The measurement management unit 450 of the base station 4 in the radio transmission suspension state St_12 acquires from the RNC 200 via the network communication unit 350 load data of the base station 3 (Step S40). The measurement management unit 450 of the base station 4 judges whether load data of the base station 3 is larger than a predetermined threshold value (Step S41). In case the load data is smaller than the predetermined threshold value, the measurement management unit 450 performs determination not to carry out received power measurement of the mobile station signal estimation unit 364. And in case the load data is smaller than the predetermined threshold value, the measurement management unit 450 carries out processing of Step S40 and Step S41 repeatedly.

In case the load data is larger than the threshold value, the load management unit 450 issues a direction to carry out received power measurement of the mobile station signal estimation unit 364. As a result, the mobile station signal estimation unit 364 measures received power of a transmission signal from a mobile station to other base station (Step S42). The mobile station signal estimation unit 364 judges whether the received power value measured based on a signal from the RF unit 352 is larger than a predetermined threshold value (Step S43). In case the received power value is smaller than the threshold, processing of Steps S40-S43 is carried out once again. In case the received power value is larger than the threshold value, it is possible to decide that a mobile station in communication exists around the base station 4. In this case, the state change control unit 358 makes an operation state of the base station 2 change to the active state St_11 and issues a direction to the power control unit 360 to start transmission of the pilot signal with predetermined power from the transmission signal processing unit 356 (Step S44). The state change control unit 358 reports to the RNC 200 via the network communication unit 350 that the base station 4 changed to the active state St_11 (Step S45).

By the way, electric power of predetermined amount is consumed also by received power measurement of the mobile station signal estimation unit 364. Accordingly, from a view point of power efficiency improvement, wasteful received power measurement which does not contribute to accuracy improvement of state change should be omitted to the utmost. Accordingly, in the second exemplary embodiment described above, the base station 4 obtains the load data; and in case the load data is smaller than the predetermined threshold value (that is, in case communication load of the base station 3 is light), does not perform received power measurement; and in case the load data is larger than the predetermined threshold value (that is, in case communication load of the base station 3 is heavy), for the first time at that point, performs received power measurement. Accordingly, because received power measurement of the base station 4 is performed when received power measurement is really required, for example, only in the case base station 3 is at heavy load, electric power consumed wastefully can be reduced with certainty.

Further, in case the load of the base station 3 is light, the base station 4 does not perform received power measurement. That is, because the base station 4 does not change to the active state St_11, the transmission suspension state of the pilot signal in case load of the base station 3 is light can be kept. As a result, radio interference to the base station 3 is reduced.

Further, in the above, although it was described that, only in case load data of the base station 3 as the first base station is larger than a predetermined threshold value, the base station 4 as the second base station performs received power measurement, control of the received power measurement based on the load data concerned is not limited to the above.

Figure 13:
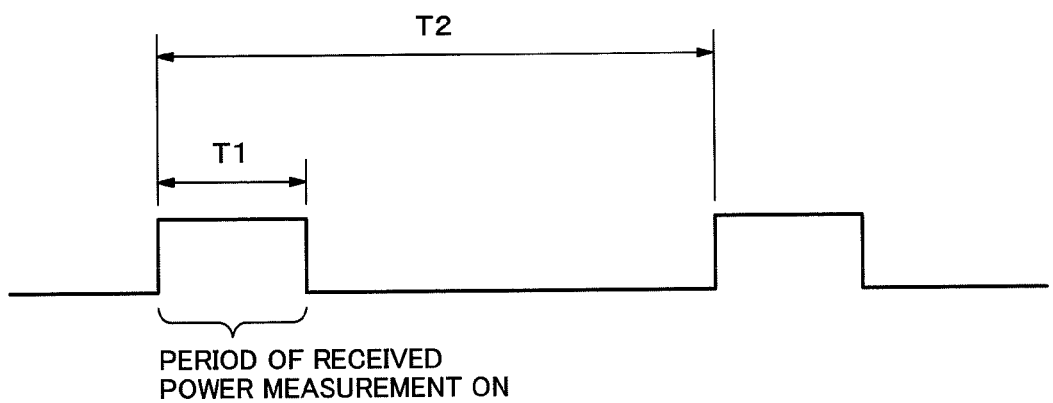
[FIG. 13] A drawing for explaining a situation in which at least one of a period ON of received power measurement and a cycle of the period ON in the second base station based on load data of the first base station is varied

For example, as shown in FIG. 13, at least one of ON period T1 of received power measurement and cycle T2 of the ON period can be varied based on the load data.

Further, in the above, it was described that, the base station 4 as the second base station compares the measured received power value with a predetermined threshold value, and in case the received power is larger than the threshold value, makes an operation state of the base station 4 change to the active state St_11. Here, the predetermined threshold value needn't necessarily be a fixed threshold value, and can be a varying threshold value. In that case, for example, the threshold value concerned can be made vary depending on load data of the base station 3.

Further, in the second exemplary embodiment mentioned above, although it was described that, based on load data of the base station 3, determination of whether to perform received power measurement is performed in the base station 4, the determination concerned needn't necessarily be performed in the base station 4. For example, it is possible to perform the determination concerned in the RNC 200, and the base station 4 receives only the result.

Third Exemplary Embodiment

Figure 14:
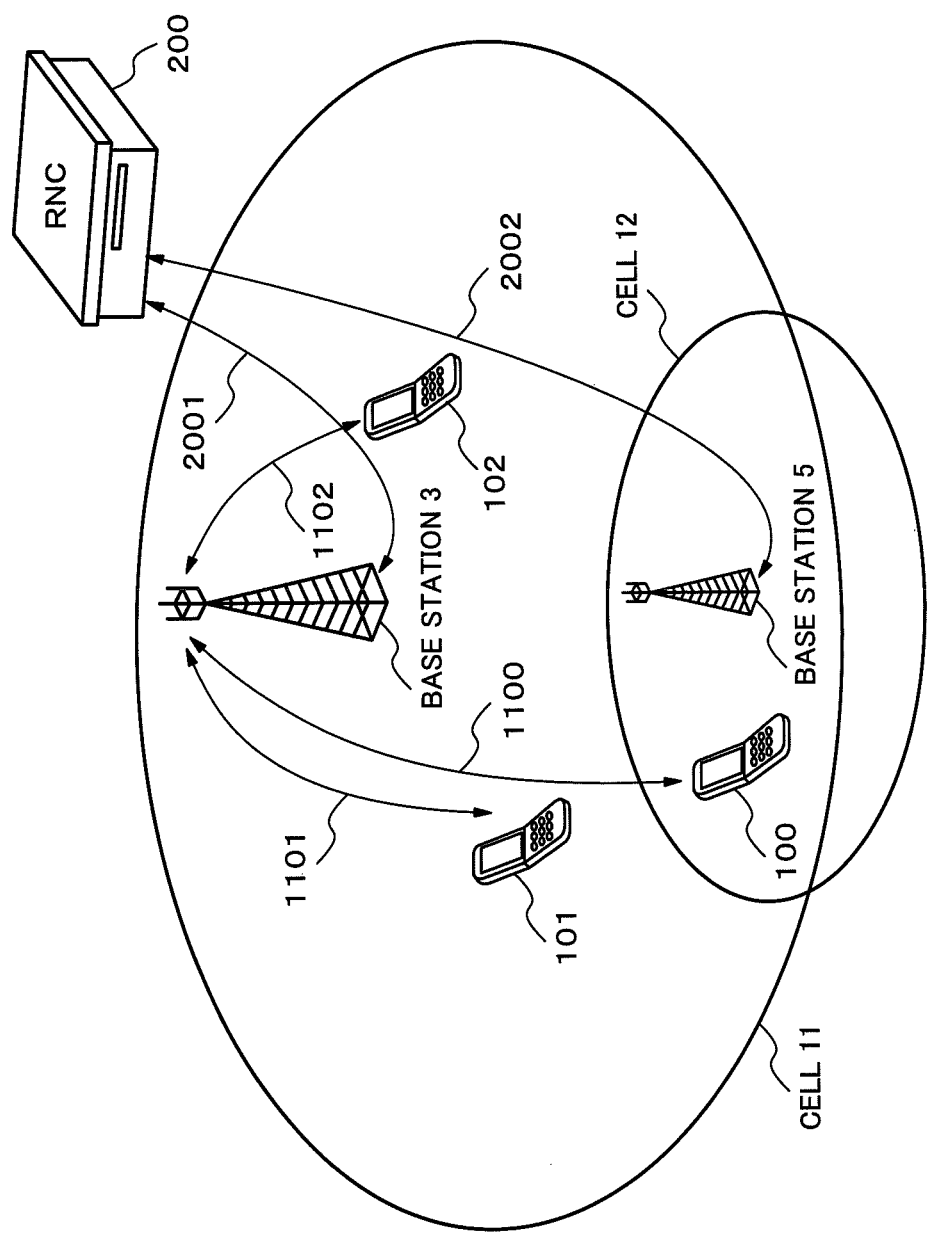
[FIG. 14] A block diagram showing an example of a radio communications system according to the third exemplary embodiment of the present invention

FIG. 14 is a block diagram showing an example of a radio communications system according to the third exemplary embodiment of the present invention. The entire structure of this radio communications system is identical with a radio communications system of the second exemplary embodiment shown in FIG. 9. The difference of the third exemplary embodiment from the second exemplary embodiment exists in a structure of a second base station. Hereinafter, a base station as the second base station in the radio communications system of the third exemplary embodiment is newly referred to as a base station 5. Accordingly, in this radio communications system, a base station as the first base station is still the base station 3 (refer to FIG. 9) of the second exemplary embodiment.

Figure 15:
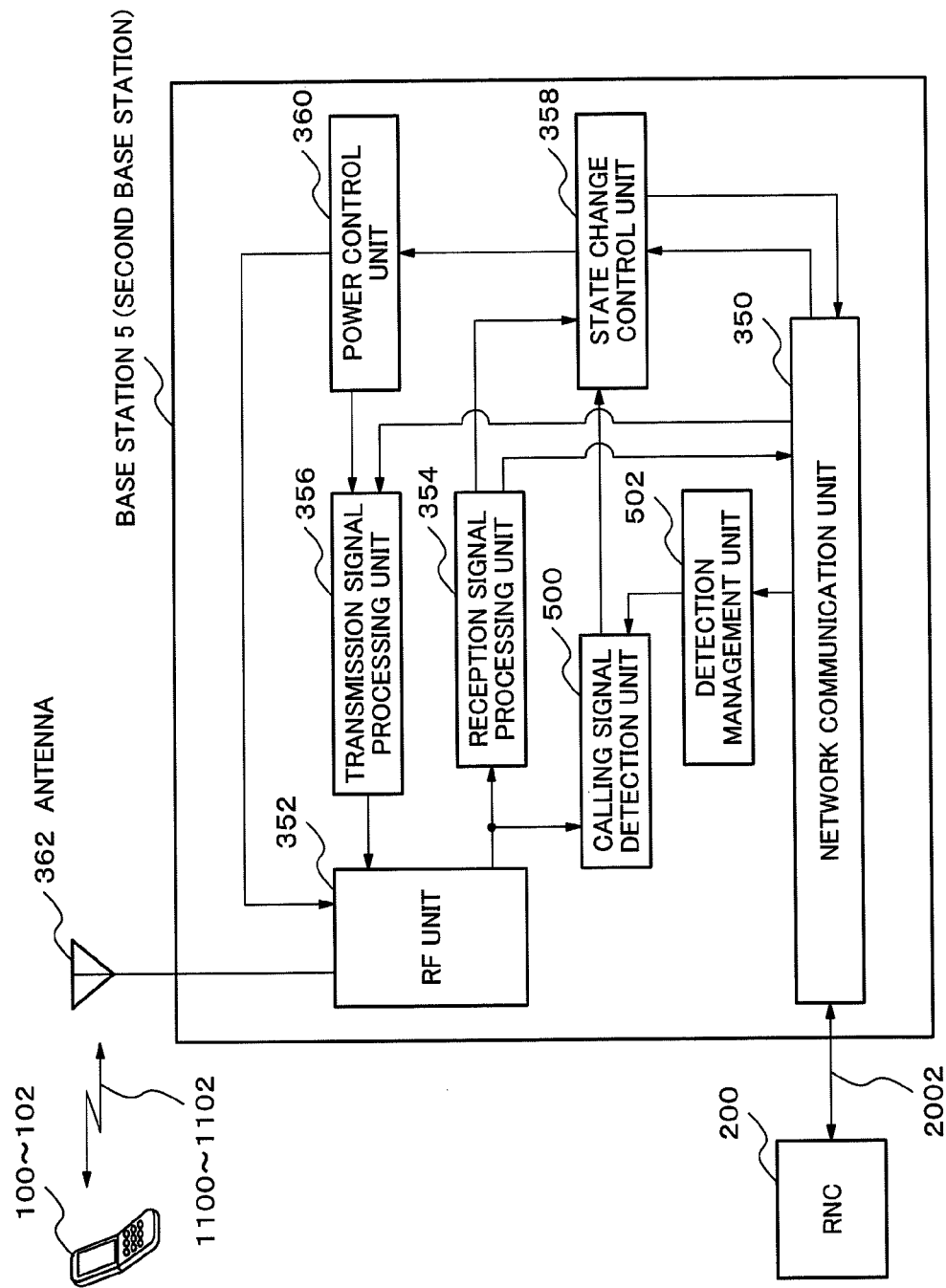
[FIG. 15] A block diagram showing an example of a second base station in the third exemplary embodiment

FIG. 15 is a block diagram showing an example of the base station 5 as the second base station of a radio communications system according to the third exemplary embodiment. The base station 5 includes a calling signal detection unit 500 instead of the mobile station signal estimation unit 364 of the base station 4 (the second base station in the second exemplary embodiment) shown in FIG. 11 and further, includes a detection management unit 502 instead of the measurement management unit 450 of the base station 4. Because elements other than these calling signal detection unit 500 and detection management unit 502 of the base station 5 are identical with the elements of the base station 4, their description will be omitted.

Here, in general, when a mobile station performs outgoing call, by receiving the pilot signal of a base station, it obtains identification information unique to the base station and synchronization timing. The mobile station which obtained synchronization performs outgoing call by transmitting a connection request to the base station using a power ramping scheme. Here, the power ramping scheme is a method in which, in order for a mobile station not to give interference to communication of other mobile stations by using unnecessarily strong power, output is raised gradually from low power prescribed in advance and the output is raised until a connection request reaches a base station. When a connection request of a mobile station is received, a base station transmits acknowledgement to the mobile station and directs the mobile station of transmission power.

The calling signal detection unit 500 detects a signal when a mobile station (in FIG. 14, for example, the mobile station 100) places a call to the base station 3, for example, a signal of PRACH, (Physical Random Access Channel). That is, by confirming whether identification information unique to the base station 3 is included in a reception signal, the calling signal detection unit 500 detects a presence of a connection request to the base station 3 (in other words, outgoing call to the base station 3).

Here, as identification information unique to the base station 3, for example, scrambling code and signature in W-CDMA scheme can be mentioned (refer to "W-CDMA mobile communications system" (Keiji Tachikawa, Maruzen publication, Jun. 25, 2001, p. 45-p. 47)). The detection management unit 502 determines whether calling signal detection of the calling signal detection unit 500 is performed based on load data of the base station 3 acquired from the RNC 200. Further, the detection management unit 502 acquires identification information unique to the base station 3 which is information necessary for calling signal detection of the calling signal detection unit 500 from the RNC 200 or the base station 3.

Hereinafter, operation of a radio communications system of this exemplary embodiment in case the base station 5 as this second base station changes from the radio transmission suspension state St_12 to the active state St_11 is described.

In this radio communications system, by confirming whether identification information unique to the base station 3 is included in a reception signal, the base station 5 detects a presence of a connection request to the base station 3 (in other words, outgoing call to the base station 3). In case a connection request of the mobile station 100 to the base station 3 is detected, the base station 5 decides that the mobile station 100 placed a call around the base station 5, and makes a state of own base station change to the active state St_11. In order to detect a signal of the connection request of the mobile station 100 to the base station 3, the base station 5 acquires in advance a list of identification information which the base station 3 uses. Specifically, the detection management unit 502 acquires the list concerned from the RNC 200 or the base station 3.

The base station 3 reports to the RNC 200 load data of own base station (number of mobile stations which own base station supports, or entire traffic, or both of them). As a result, the RNC 200 transmits the load data of the base station 3 to the base station 5 in the radio transmission suspension state St_12. The load data is received by the network communication unit 350 of the base station 5, and is outputted to the detection management unit 502. As a result, the detection management unit 502 of the base station 5 compares the load data of the base station 3 with a predetermined threshold value. In case the load of the base station 3 is judged by the detection management unit 502 to be smaller than the predetermined threshold value, the calling signal detection unit 500 of the base station 5 does not carry out calling signal detection. On the other hand, in case the load of the base station 3 is decided by the detection management unit 502 to be larger than the predetermined threshold value, the calling signal detection unit 500 of the base station 5 carries out calling signal detection. Specifically, the calling signal detection unit 500 detects whether a calling signal of the mobile station 100 is included in a reception signal using identification information of the base station 3. In case the calling signal detection unit 500 detects the outgoing call of the mobile station 100 in the reception signal, the base station 5 changes from the radio transmission suspension state St_12 to the active state St_11 and starts transmission of the pilot signal with predetermined power. The base station 5 reports to the RNC 200 that the base station 5 changed to the active state St_11. The RNC 200 transmits a reply to the report concerned to the base station 5. The mobile station 100 which received the pilot signal of the base station 5 acquires identification information unique to the base station 5 and synchronizes. The mobile station 100 which synchronized places a call to the base station 5, performs a connection request, and starts communication with the base station 5.

Figure 16:
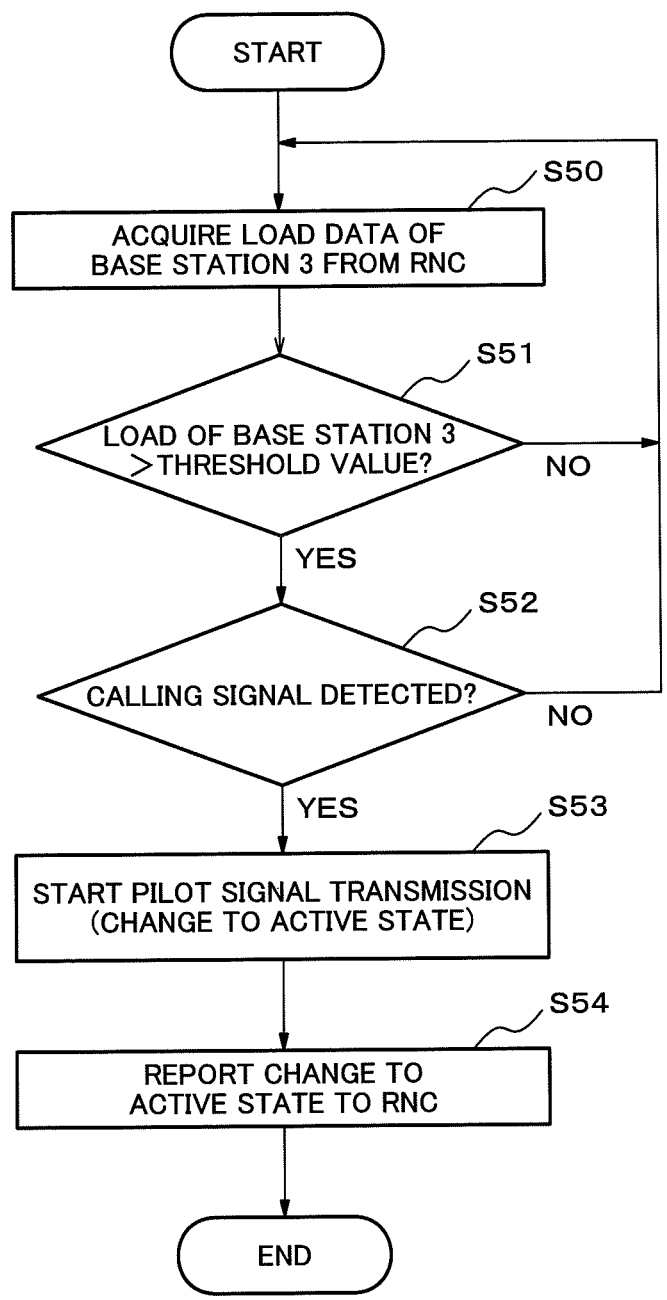
[FIG. 16] A flow chart showing an example of operation of the second base station in case of, in the third exemplary embodiment, changing from the radio transmission suspension state to the active state

FIG. 16 is a flow chart showing an example of operation of the base station 5 as the second base station in case of changing from the radio transmission suspension state St_12 to the active state St_11. The condition that processing shown in the flow concerned is called in the base station 5 is when the base station 5 changes to the radio transmission suspension state St_12.

The detection management unit 502 of the base station 5 in the radio transmission suspension state St_12 acquires from the RNC 200 via the network communication unit 350 load data of the base station 3 (Step S50). The detection management unit 502 judges whether the load data of the base station 3 is larger than a predetermined threshold value (Step S51). In case the load data is smaller than the predetermined threshold value, the detection management unit 502 performs determination not to carry out calling signal detection of the calling signal detection unit 500. And in case the load data is smaller than the predetermined threshold value, the detection management unit 502 carries out processing of Step S50 and Step S51 repeatedly.

In case the load data is larger than the predetermined threshold value, the detection management unit 502 performs determination to carry out calling signal detection of the calling signal detection unit 500. The calling signal detection unit 500 judges whether a calling signal could be detected (Step S52). In case the outgoing call cannot be detected, processing of Steps S50-S52 is carried out once again. In case the calling signal is detected by the calling signal detection unit 500, it is possible to decide that a mobile station placed a call around the base station 5. In this case, the state change control unit 358 makes an operation state of the base station 5 change to the active state St_11 and issues a direction to the power control unit 360 to start transmission of the pilot signal with predetermined power from the transmission signal processing unit 356 (Step S53). The state change control unit 358 reports to the RNC 200 via the network communication unit 350 that the base station 5 changed to the active state St_11 (Step S54).

In a radio communications system according to the third exemplary embodiment described above, the base station 5 receives a transmission signal from a mobile station and starts transmission of the pilot signal with predetermined power depending on a reception condition of the transmission signal concerned. Specifically, the calling signal detection unit 500 of the base station 5 decides, by detecting a signal of a connection request of the mobile station 100 to the base station 3, that mobile station 100 placed a call around the base station 5, makes a state of the base station 5 change to the active state St_12, and starts transmission of the pilot signal with predetermined power. That is, in case of this radio communications system, the base station 5 changes to the active state St_11 for the first time in case there exists a mobile station which, while in communication with other base station at present, can communicate with own base station with certainty, and starts transmission of the pilot signal with predetermined power.

Therefore, it is possible to eliminate a base station which is started wastefully like Japanese Patent Application Laid-Open No. 2003-37555 in spite of the fact that a mobile station which can communicate does not exist, and as a result, with more certainty, it becomes possible to suppress consumption of electric power of a base station and avoid radio interference between base stations.

Further, in the third exemplary embodiment described above, the base station 5 obtains load data of the base station 3; in case the load data is smaller than a predetermined threshold value, does not perform calling signal detection (connection request detection); and in case the load data is larger than the predetermined threshold value, for the first time at that point, performs calling signal detection. Accordingly, because calling signal detection is performed in the base station 5 when calling signal detection is really required, that is, only in case the base station 3 is at heavy load, electric power consumed wastefully can be reduced with certainty.

Further, in case the load of the base station 3 is light, the base station 5 does not perform calling signal detection. That is, because the base station 5 does not change to the active state St_11, the transmission suspension state of the pilot signal in case load of the base station 3 is light can be kept. As a result, radio interference to the base station 3 is reduced.

Further, in the third exemplary embodiment described above, although it was described that the mobile station 100 which received the pilot signal of the base station 5 changes synchronization from the base station 3 to the base station 5, it is also possible, without changing synchronization and after connecting once to the base station 3, to handover connection to the base station 5. Thus, by so doing, time to starting communication can be reduced.

Further, in the above, although it was described that, only in case load data of the base station 3 as the first base station is larger than a predetermined threshold value, the base station 5 as the second base station performs calling signal, detection, control of the calling signal detection based on the load data concerned is not limited to the above. For example, as shown in FIG. 13, at least one of ON period T1 of calling signal detection and cycle T2 of the ON period concerned can be varied based on load data of the base station 3.

Also, in the third exemplary embodiment mentioned above, although it was described that the base station 5 (second base station) uses load data of the base station 3 (first base station) concerning outgoing call detection, load data needn't necessarily be used. That is, in the third exemplary embodiment, the base station 3 as the first base station can be replaced by the base station 1 in the first exemplary embodiment mentioned above (that is, base station which does not include the load management unit 400). In that case, for example, the base station 5 as the second base station starts detection of a calling signal when it becomes a radio reception measurement state.

Further, in the third exemplary embodiment described above, the base station 5 can include relation table (not shown) which relates the base station 5 and unique ID of a mobile station. And in case an outgoing call of the mobile station 100 is detected in a reception signal by the calling signal detection unit 500 of the base station 5, the base station 5 extracts unique ID of the mobile station 100 from a connection request signal of the mobile station 100 to the base station 3. The base station 5 judges whether extracted unique ID is registered within the relation table mentioned above.

In case unique ID of the mobile station is registered within the relation table (that is, in case the mobile station which performed the outgoing call concerned is related to the base station 5), the base station 5 may change from the radio transmission suspension state St_12 to the active state St_11. In this case, the base station 5 may change to the active state St_11 unconditionally (regardless of load state of the base station 3, for example). Also, in this case, the base station 5 may, depending on a predetermined condition (for example, in case the base station 3 is at heavy load), change to the active state St_11.

On the other hand, in case unique ID of the mobile station is not registered within the relation table (that is, in case the mobile station which performed the outgoing call concerned is not related to the base station 5), the base station 5 can prohibit change to the active state St_11. In this case, in case the mobile station which performed the outgoing call concerned is not related to the base station 5, the base station 5 may prohibit change to the active state St_11 even if the base station 3 is at a heavy load state.

Fourth Exemplary Embodiment

Figure 17:
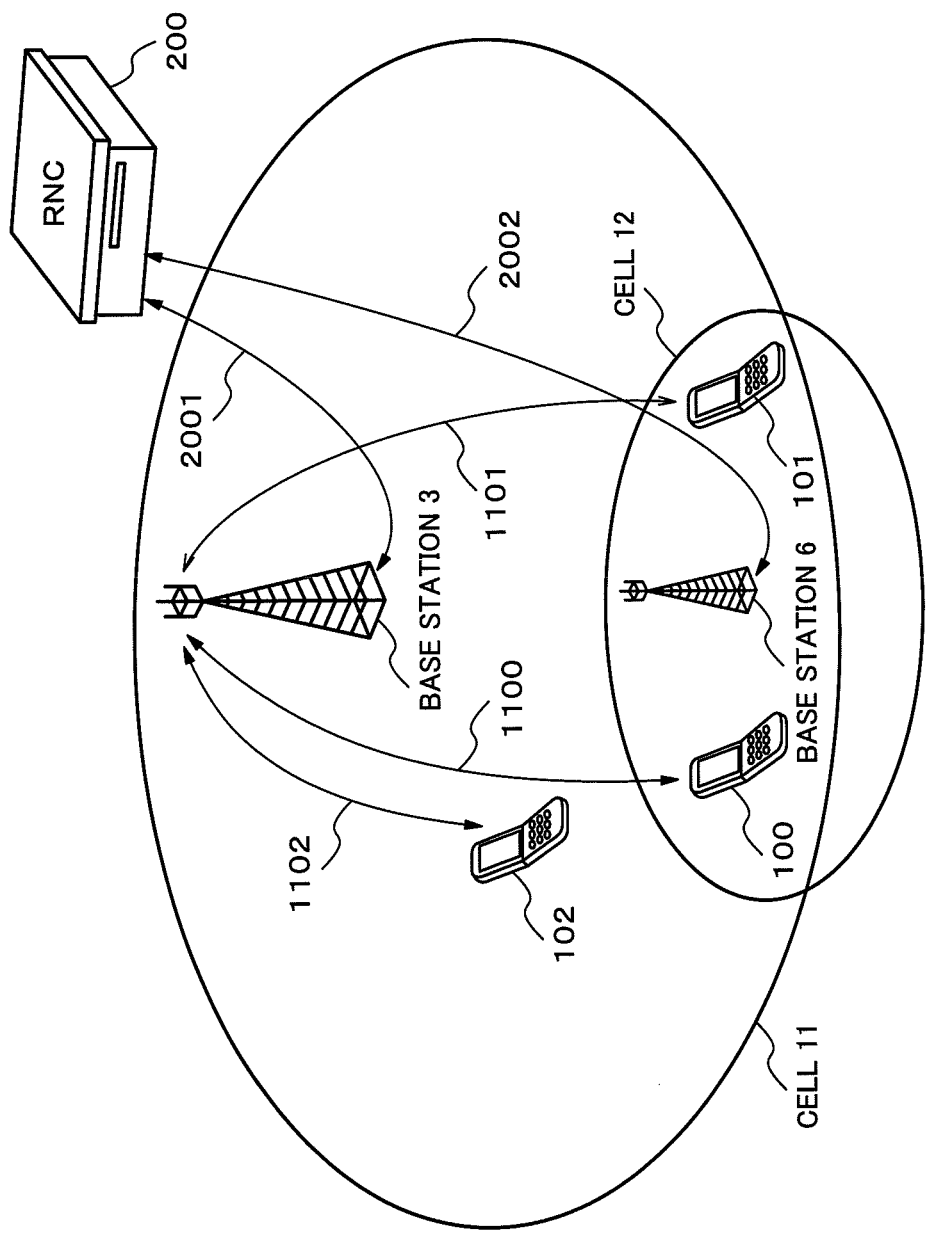
[FIG. 17] A block diagram showing an example of a radio communications system according to the fourth exemplary embodiment of the present invention

FIG. 17 is a block diagram showing an example of a radio communications system according to the fourth exemplary embodiment of the present invention. The entire structure of this radio communications system is identical with a radio communications system of the second exemplary embodiment shown in FIG. 9. The difference of the fourth exemplary embodiment from the second exemplary embodiment exists in a structure of a second base station. Hereinafter, a base station as the second base station in the radio communications system of the fourth exemplary embodiment is newly referred to as a base station 6. Accordingly, in this radio communications system, a base station as the first base station is still the base station 3 (refer to FIG. 9) of the second exemplary embodiment.

Figure 18:
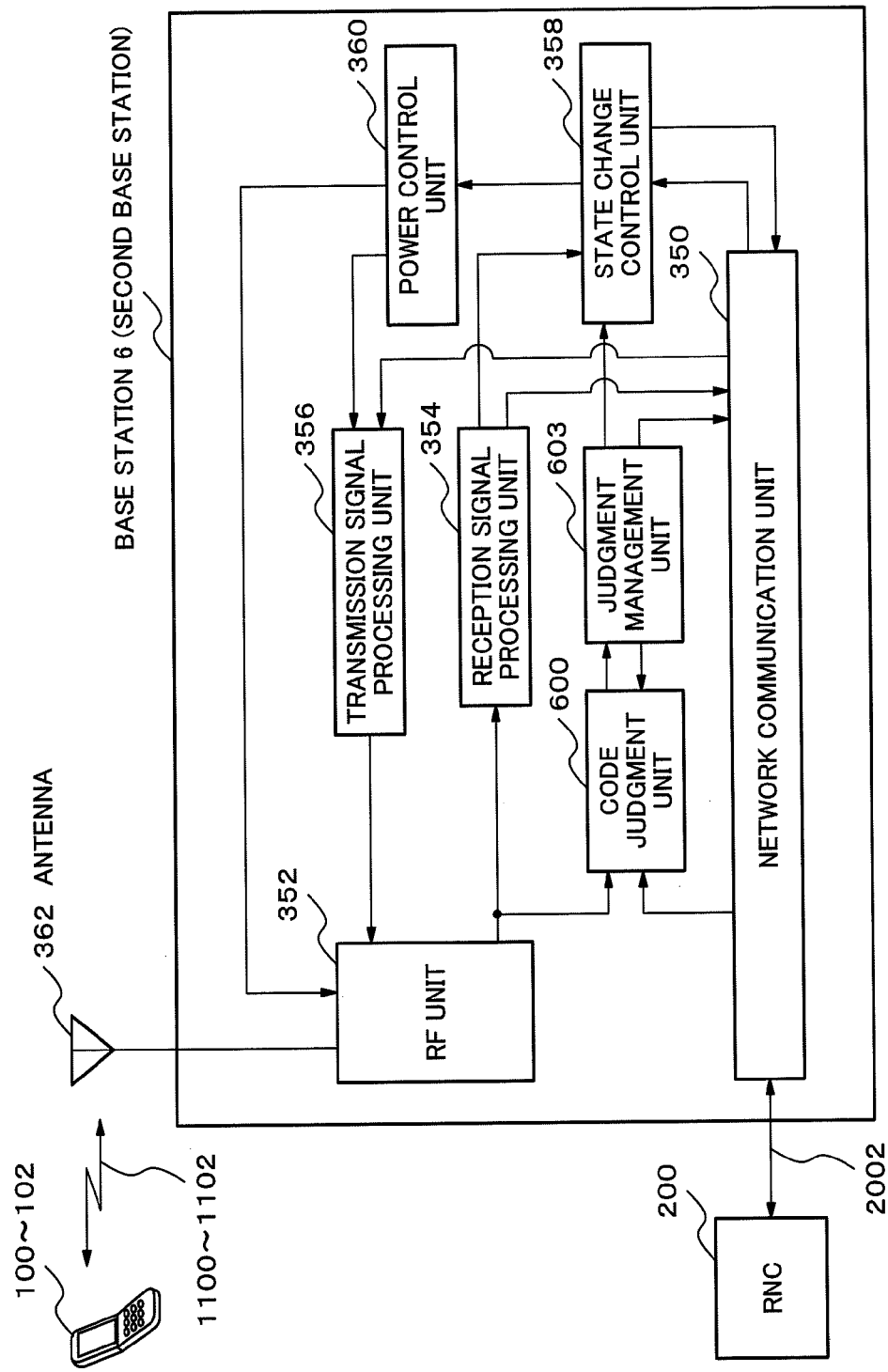
[FIG. 18] A block diagram showing an example of a second base station in the fourth exemplary embodiment

FIG. 18 is a block diagram showing an example of the base station 6 as the second base station of a radio communications system according to the fourth exemplary embodiment. The base station 6 includes a code judgment unit 600 instead of the mobile station signal estimation unit 364 of the base station 4 (the second base station in the second exemplary embodiment) shown in FIG. 11 and further, includes a judgment management unit 602 instead of the measurement management unit 450 of the base station 4. Because elements other than these code judgment unit 600 and judgment management unit 602 of the base station 6 are identical with the elements of the base station 4, their description will be omitted.

In FIG. 17, when communicating with the base station 3, each of the mobile stations 100-102 communicates using radio resources allocation information (identification code, for example) designated respectively by the base station 3. At that time, the base station 3 reports to the RNC 200 the radio resources allocation information which the base station 3 is using. The code judgment unit 600 of the base station 6 acquires the radio resources allocation information which the base station 3 is using from the RNC 200 or the base station 3. And the code judgment unit 600 judges, using this radio resources allocation information, whether a transmission signal of a mobile station is included in a reception signal, that is, whether a mobile station communicating in the neighborhoods of the base station 6 exists. The judgment management unit 602 determines whether code judgment of the code judgment unit 600 is performed based on load data of the base station 3 acquired from the RNC 200 and counts a result of the code judgment of the code judgment unit 600.

Hereinafter, operation of a radio communications system of this exemplary embodiment in case this base station 6 changes from the radio transmission suspension state St_12 to the active state St_11 is described. As described above, when communicating with the base station 3, each of the mobile stations 100-102 communicates using radio resources allocation information (identification code, for example) designated respectively by the base station 3. The base station 3 reports to the RNC 200 the radio resources allocation information which one's self is using. The base station 6 acquires from the RNC 200 the radio resources allocation information which the base station 3 is using. And the base station 6 judges, using this radio resources allocation information, whether a transmission signal of a mobile station is included in a reception signal, that is, whether a mobile station communicating in the neighborhood of the base station 6 exists.

Firstly, the base station 3 reports to the RNC 200 load data of own base station (number of mobile stations which own base station supports, or entire traffic, or both of them). The RNC 200 transmits the load data of the base station 3 to the base station 6 in the radio transmission suspension state St_12. The judgment management unit 602 of the base station 6 compares the load data of the base station 3 with a predetermined threshold value. In case the load of the base station 3 is judged by the judgment management unit 602 to be smaller than the predetermined threshold value, the code judgment unit 600 of the base station 6 does not perform code judgment. On the other hand, in case the load of the base station 3 is judged by the judgment management unit 602 to be larger than the predetermined threshold value, the code judgment unit 600 of the base station 6 performs code judgment. In this case, the code judgment unit 600 acquires from the RNC 200 the radio resources allocation information which the base station 3 is using. The code judgment unit 600 judges, using the acquired radio resources allocation information, whether a transmission signal of a mobile station is included in a reception signal. As a result of judgment of the code judgment unit 600, in case a transmission signal of a mobile station is included in the reception signal, that is, in case mobile stations performing communication in the neighborhood of the base station 6 (the mobile station 100 and mobile 101 in FIG. 17, for example) exist, the base station 6 changes from the radio transmission suspension state St_12 to the active state St_11, and starts transmission of the pilot signal with predetermined power.

Figure 19:
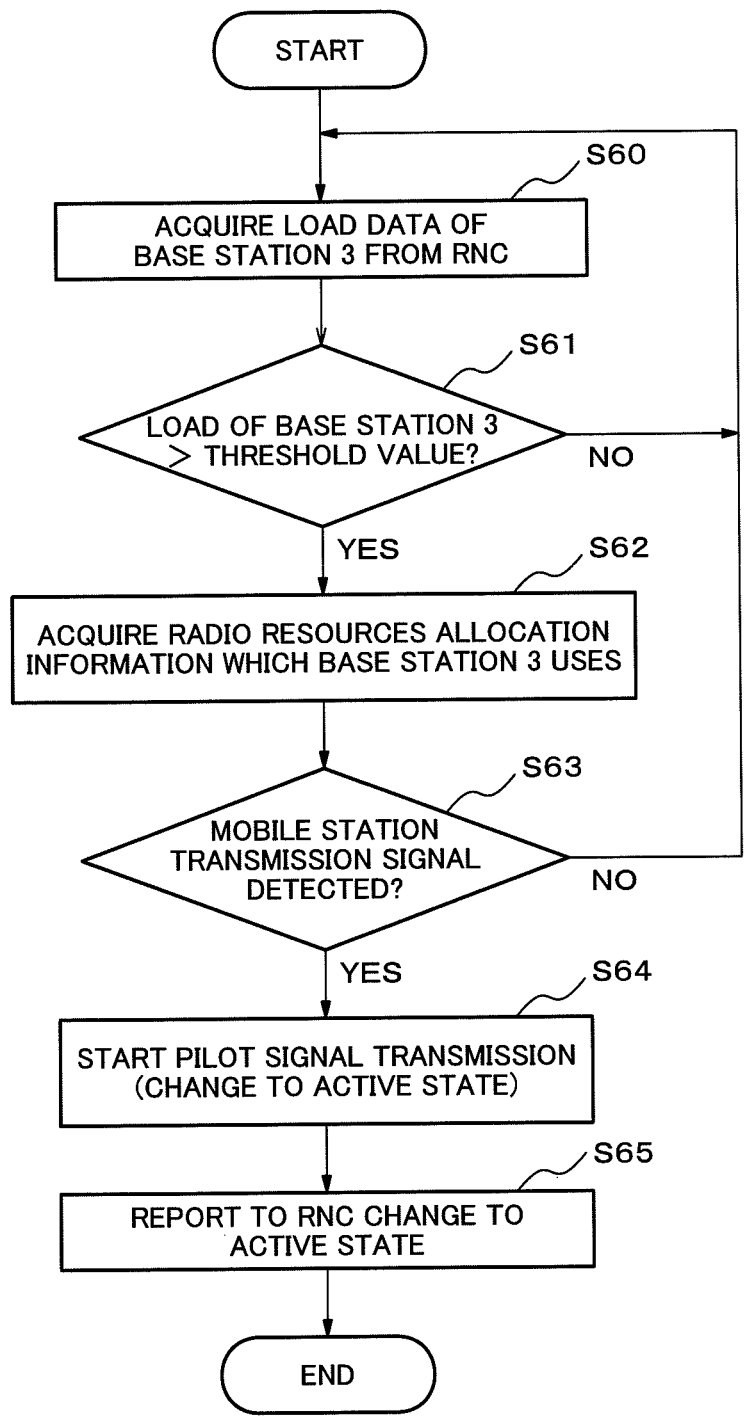
[FIG. 19] A flow chart showing an example of operation of the second base station in case of, in the fourth exemplary embodiment, changing from the radio transmission suspension state to the active state

FIG. 19 is a flow chart showing an example of operation of the base station 6 as the second base station in case of changing from the radio transmission suspension state St_12 to the active state St_11. The condition that processing shown in the aspect flow is called in the base station 6 is when the base station 6 changes to the radio transmission suspension state St_12.

The judgment management unit 602 of the base station 6 in the radio transmission suspension state St_12 acquires from the RNC 200 via the network communication unit 350 load data of the base station 3 (Step S60). The judgment management unit 602 judges whether the load data of the base station 3 is larger than a predetermined threshold value (Step S61). In case the load data is smaller than the predetermined threshold value (in case judged as No in Step S61), the judgment management unit 602 performs determination not to carry out code judgment of the code judgment unit 600. And in case the load data is smaller than the predetermined threshold value, the judgment management unit 602 carries out processing of Step S60 and Step S61 repeatedly.

In case the load data is larger than the predetermined threshold value (in case judged as Yes in Step S61), the judgment management unit 602 performs determination to carry out code judgment of the code judgment unit 600. And the judgment management unit 602 acquires from the RNC 200 via the network communication unit 350 radio resources allocation information which is information used by code judgment of the code judgment unit 600 and which the base station 3 is using (Step S62). The code judgment unit 600 performs judgment of whether a transmission signal of a mobile station is included in a reception signal using each radio resources allocation information (Step S63). In case a transmission signal of a mobile station cannot be detected in the code judgment unit 600 even using all of the radio resources allocation information, processing of Steps S60-63 are carried out once again. In case a transmission signal of a mobile station can be detected in the code judgment unit 600 using either of the radio resources allocation information, the state change control unit 358 makes an operation state of the base station 6 change to the active state St_11 and issues a direction to the power control unit 350 to start transmission of the pilot signal with predetermined power from the transmission signal processing unit 356 (Step S64). The state change control unit 358 reports to the RNC 200 via the network communication unit 350 that the base station 6 changed to the active state St_11 (Step S65).

In a radio communications system according to the fourth exemplary embodiment described above, the base station 6 receives a transmission signal from a mobile station and starts transmission of the pilot signal with predetermined power depending on a reception condition of the transmission signal concerned. Specifically, the code judgment unit 600 of the base station 6 performs judgment of whether a transmission signal of a mobile station is included in a reception signal using radio resources allocation information which the base station 3 is using. By performing judgment of whether a transmission signal of a mobile station is included in a reception signal using the radio resources allocation information, that is, a mobile station performing communication in the neighborhood of the base station 6 is decided to exist, a state of the base station 6 is made change to the active state St_12, and transmission of the pilot signal with predetermined power is started. That is, in case of this radio communications system, the base station 6 changes to the active state St_11 for the first time in case there exists a mobile station which, while in communication with other base station at present, can communicate with own base station with certainty, and starts transmission of the pilot signal with predetermined power.

Therefore, it is possible to eliminate a base station which is started wastefully like Japanese Patent Application Laid-Open No. 2003-37555 in spite of the fact that a mobile station which can communicate does not exist, and as a result, with more certainty, it becomes possible to suppress consumption of electric power of a base station and avoid radio interference between base stations.

Further, in the fourth exemplary embodiment described above, the base station 6 obtains load data of the base station 3; and in case the load data is smaller than a predetermined threshold value, does not carry out judgment of whether a transmission signal of a mobile station is included in a reception signal using radio resources allocation information; and in case the load data is larger than the predetermined threshold value, for the first time at that point, carries out the judgment concerned. Accordingly, because judgment of whether a transmission signal of a mobile station is included in a reception signal is performed in the base station 6 using radio resources allocation information when judgment of whether a transmission signal of a mobile station is included is really required, that is, only in case heavy load is imposed on the base station 3, electric power consumed wastefully in the base station 6 can be reduced with certainty.

Further in case the load of the base station 3 is light, the base station 6 does not carry out the judgment processing concerned. That is, because the base station 6 does not change to the active state St_11, the transmission suspension state of the pilot signal in case load of the base station 3 is light can be kept. As a result, radio interference to the base station 3 is reduced.

Further, in the fourth exemplary embodiment described above, although it was described that the base station 6 acquires radio resources allocation information of a mobile station from the RNC 200 or the base station 3, it is not limited to this. For example, in case allocation of radio resources is limited, it is also possible for the base station 6 to include in advance all the radio resources allocation information which has possibility to be used, and to perform detection of a transmission signal of a mobile station by using it. Thus, by so doing, communication between the base station 6 and the RNC 200 or the base stations 3 and processing load of each equipment can be reduced.

Also, in the fourth exemplary embodiment described above, as radio resources allocation information, for example, information of time slot assigned to each mobile station can also be used; information of spreading code assigned to each mobile station can also be used; and further, information of frequency band assigned to each mobile station can also be used. And it is also possible to combine this information and perform detection of a transmission signal of a mobile station.

Also, in the fourth exemplary embodiment mentioned above, although it was described that the base station 6 (the second base station) uses load data of the base station 3 (the first base station) concerning judgment of whether a transmission signal of a mobile station to other base station is included in a reception signal using radio resources allocation information, the use of load data is not essential. That is, in the fourth exemplary embodiment, the base station 3 as the first base station can be replaced by the base station 1 in the first exemplary embodiment mentioned above (that is, base station which does not include the load management unit 400). In that case, for example, the base station 6 as the second base station starts the judgment mentioned above using radio resources allocation information when it becomes a radio reception measurement state.

Further, in the above, although it was described that, only in case load data of the base station 3 as the first base station is larger than a predetermined threshold value, the base station 6 as the second base station performs the code judgment mentioned above, control of the code judgment based on the load data concerned is not limited to the above. For example, as shown in FIG. 13, at least one of ON period T1 of code judgment and cycle T2 of the ON period concerned can be varied based on load data of the base station 3.

Further, in the fourth exemplary embodiment described above, the base station 6 can include relation table (not shown) which relates the base station 6 and unique ID of a mobile station. And in case being judged by the code judgment unit 600 of the base station 6 that a transmission signal of mobile stations (the mobile stations 100 and 101 in FIG. 17, for example) is included in a reception signal, the base station 6 extracts unique ID of the mobile station from the reception signal using radio resources allocation information. The base station 6 judges whether extracted unique ID is registered within the relation table mentioned above.

In case unique ID of the mobile station is registered within the relation table (that is, in case the mobile station transmitting a signal to the base station 3 is related to the base station 6), the base station 6 may change from the radio transmission suspension state St_12 to the active state St_11. In this case, the base station 6 may change to the active state St_11 unconditionally (regardless of load state of the base station 3, for example). Also, in this case, the base station 6 may, depending on a predetermined condition (for example, only in case heavy load is imposed on the base station 3), change to the active state St_11.

On the other hand, in case unique ID of the mobile station is not registered within the relation table (that is, in case the mobile station transmitting a signal to the base station 3 is not related to the base station 6), the base station 6 can prohibit change to the active state St_11. In this case, in case the mobile station which transmitted the signal to the base station 3 is not related to the base station 6, the base station 6 may prohibit change to the active state St_11 even if the base station 3 is at a heavy load state.

Also, in the first to fourth exemplary embodiment described above, distribution of a function of each component inside the first base station (the base station 1 and the base station 3, for example) and the second base station (the base station 2, the base station 4, the base station 5 and the base station 6, for example) is not necessarily limited to the exemplary embodiments mentioned above (refer to FIG. 2, FIG. 3, FIG. 10, FIG. 11, FIG. 15 and FIG. 18). Accordingly, the present components may be arbitrarily divided or integrated, or functions may be transferred between the components. For example, in the base station 2 as the second base station shown in FIG. 3, the mobile station signal estimation unit 364 and the state change control unit 358 can be integrated. That is, this integrated unit carries out the function of the mobile station signal estimation unit 364 (function to detect a transmission signal of a surrounding mobile station to other base station out of a signal received from the RF unit 352) and the function of the state change control unit 358 (function to control state change of the base station 2 based on predetermined information or a direction). That is, a base station including this integrated unit shows the performance equal to the base station 2 shown in FIG. 3. Although it is to repeat a description, distribution of functions of components of each base station in each exemplary embodiment mentioned above and their names are examples at the utmost, and they can be changed arbitrarily without being restricted by each exemplary embodiment mentioned above.

In a radio communications system according to the first to fourth exemplary embodiment described above, it was described that a base station (second base station) receives a transmission signal from a mobile station to other base station (first base station), and starts transmission of the pilot signal with predetermined power depending on a reception condition of the transmission signal concerned. That is, in case of a radio communications system according to the first to fourth exemplary embodiment, the second base station changes to the active state St_11 for the first time in case there exists a mobile station which, while in communication with the first base station at present, can communicate with the second base station with certainty, and starts transmission of the pilot signal with predetermined power. However, even if there exists one "mobile station which, while in communication with the first base station at present, can communicate with the second base station with certainty", there is no need for the second base station always changes to the active state St_11 necessarily. For example, the second base station may change to the active state St_11 for the first time in case there exist mobile stations mentioned above more than a predetermined plural number.

In the first to fourth exemplary embodiment described above, although description was made by using the pilot signal as the control signal, it is not limited to the pilot signal, and it may be an embodiment using a signal which reports information unique to a cell or information unique to a system.

Also, in the first to fourth exemplary embodiment described above, although it was described that a first base station adds a cell of a base station which becomes an active state to a measurement cell set and directs a mobile station to measure the cell, this processing can be omitted. In that case, the mobile station also can, by measuring received power of the pilot signal autonomously and receiving identification signal of a cell from a control signal of the cell and so on, report the pilot received power together with an identification number of the cell.

Also, in the first to fourth exemplary embodiment described above, although it was described that a base station and a cell correspond to one to one, one base station can also have a plurality of cells. In that case, the base station can perform, for each cell, change control to an active state and a radio reception measurement state.

Also, in the first to fourth exemplary embodiment described above, it was described that the first base station (the base station 1 and the base station 3, for example) and the second base station (the base station 2, the base station 4, the base station 5 and the base station 6, for example) are loaded with exclusive functions respectively, and are special purpose machines conforming to each purpose. However, by loading one base station with the function which only the other base station is loaded, the functions of the first base station and the second base station are to be shared. Accordingly, by so doing, it is also possible for the second base station to carry a function of the first base station which was described above, and oppositely, for the first base station to carry a function of the second base station.

Also, in the first to fourth exemplary embodiment described above, the RNC 200 is not necessarily an indispensable component. For example, each of a first base station and a second base station can also be made of a structure which includes functions of the RNC 200. In that case, the first base station and the second base station are connected directly via a predetermined communication network (cable communication network, for example). In this case, for example, after the second base station becomes an active state, instead of reporting to the RNC 200, it is also possible to notify the first base station directly, and to change the measurement cell set.

Also, in the first to fourth exemplary embodiment described above, it was described that each of the first base station and the second base station is controlled by special purpose hardware. However, it is also possible for the first base station and the second base station to be controlled based on a control program by a computer circuit (CPU (Central Processing Unit), for example) which is not shown, and to operate. In that case, these control programs are stored in a storage medium (such as ROM (Read Only Memory) or hard disk, for example) inside each of base station mentioned above or in an external storage medium (such as removable media or removable disk, for example), and are read out by the computer circuit mentioned above and carried out.

Also, a cell configuration of a first and a second base station of a radio communications system of the first to fourth exemplary embodiment described above can be made a hierarchy cell (also referred to as an overlap cell) structure. For example, it is also possible to make a first base station a macro cell, and a second base station a small cell (for example, micro cell, micro cell, nano cell or femto cell, and so on) whose entire cover area is included in the cover area of the macro cell.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2008-276028, filed on Oct. 27, 2008, the disclosure of which is incorporated herein in its entirety by reference.

The invention claimed is:

1. A base station comprising:
  a decision unit which receives a transmission signal from a mobile station to another base station whose cell overlaps partially with a cell of the base station and decides a reception condition of the transmission signal;
  a state change control unit which controls transition of a state of the base station between a sleep state, in which signal transmission from the base station is suspended, and a normal state, in which signal transmission from the base station is performed, based on a decision result of the decision unit; and
  a transmission control unit which controls start and suspension of signal transmission of a control signal including a pilot signal with predetermined power based on an instruction of the state change control unit.

2. The base station according to claim 1, wherein
  said decision unit includes a mobile station signal estimation unit which outputs said reception condition as a measurement result of a received power of the transmission signal from said mobile station to said other base station in upstream band
  which is compared with a predetermined threshold value for changing the state of the base station,
  wherein the state change control unit instructs the transmission control unit to suspend the signal transmission when the mobile station estimation unit outputs said measurement result, while in the normal state, which goes below a predetermined power for changing the state to the sleep state, and
  wherein the state change control unit instructs the transmission control unit to start the signal transmission when the mobile station estimation unit outputs said measurement result, while in the sleep state, which exceeds a predetermined power for changing the state to the normal state.

3. The base station according to claim 2, further comprising:
  a measurement management unit which receives a load concerning the other base station and instructs the mobile station signal estimation unit to perform operate when the load is higher than a predetermined threshold value.

4. The base station according to claim 1, wherein said decision unit includes a calling signal detection unit which detects a connection request from the mobile station to the other base station by identification information unique to the other base station included in the transmission signal from the mobile station and outputs said reception condition as a detection condition of the connection request from said mobile station to said other base station, and
  wherein the state change control unit instructs the transmission control unit to start the signal transmission when the calling signal detection unit outputs said detection condition, while in the sleep state, which indicates that the connection request from the mobile station to the other base station is detected.

5. The base station according to claim 4, further comprising:
  a detection management unit which received a load concerning the other base station and instructs the calling signal detection unit to perform operation when the load is higher than a predetermined threshold value.

6. The base station according to claim 1, wherein said decision unit includes a code judgment unit which judges the transmission signal from the mobile station by using radio resources allocation information being used by the other base station and outputs said reception condition as a judgment result of the transmission signal from said mobile station to said other base station, and wherein the state change control unit instructs the transmission unit to start the signal transmission when the code judgment unit outputs said judgment result, while in the sleep state, which indicates that the radio resources allocation information is included in the transmission signal from the mobile station.

7. The base station according to claim 6, further comprising:
a judgment management unit which receives a load concerning the other base station and instructs the code judgment unit to perform operation when the load is higher than a predetermined threshold value.

8. A control method of a base station comprising:
receiving a transmission signal from a mobile station to another base station whose cell overlaps partially with a cell of the base station;
deciding a reception condition of the transmission signal;
controlling transition of a state of the base station between a sleep state, in which signal transmission from the base station is suspended and a normal state, in which signal transmission from the base station is performed, based on a result of deciding the reception condition; and
controlling start and suspension of signal transmission of a control signal including a pilot signal with predetermined power based on a result of said controlling transition step.

9. The control method of a base station according to claim 8, wherein said deciding step includes a mobile station signal estimating step which outputs said reception condition is a measurement result of a received power of the transmission signal from said mobile station to said other base station in upstream band, which is compared with a predetermined threshold value for changing the state of the base station,
wherein said controlling start and suspension step suspends the signal transmission based on a result of said controlling transition step when said mobile station signal estimating step outputs said measurement result, while in the normal state, which goes below a predetermined power for changing the state to the sleep state, and
wherein said controlling start and suspension step starts the signal transmission based on a result of said controlling transition step when said mobile station signal estimating step outputs said measurement result, while in the sleep state, which exceeds a predetermined power for changing the state to the normal state.

10. The control method of a base station according to claim 9, further comprising:
receiving a load concerning the other base station and performing said mobile station signal estimating step when the load is higher than a predetermined threshold value.

11. The control method of a base station according to claim 8, wherein said deciding step includes a calling signal detecting step which detects a connection request from the mobile station to the other base station by identification information unique to the other base station included in the transmission signal from the mobile station and outputs said reception condition as a detection condition of the connection request from said mobile station to said other base station, and
wherein said controlling start and suspension step starts the signal transmission based on a result of said controlling transition step when the calling signal detecting step outputs said detection condition, while in the sleep state, which indicates that the connection request from the mobile station to the other base station is detected.

12. The control method of a base station according to claim 11, further comprising:
receiving a load concerning the other base station and performing said calling signal detecting step when the load is higher than a predetermined threshold value.

13. The control method of a base station according to claim 8, wherein said deciding step includes a code judging step which judges the transmission signal from the mobile station by using radio resources allocation information being used by the other base station and outputs said reception condition as a judgment result of the transmission signal from said mobile station to said other base station, and
wherein said controlling start and suspension step starts the signal transmission based on a result of said controlling transition step when the code judging step outputs said judgment result, while in the sleep state, which indicates that the radio resources allocation information is included in the transmission signal from the mobile station.

14. The control method of a base station according to claim 13, further comprising:
receiving a load concerning the other base station and performing said code judging step when the load is higher than a predetermined threshold value.

15. A non-transitory computer-readable recording medium having embodied thereon a computer program, which when executed by a computer, causes the computer to function as:
a decision function to receive a transmission signal from a mobile station to another base station whose cell overlaps partially with a cell of the base station, and to decide a reception condition of the transmission signal;
a state change control function to control transition of a state of the base station between a sleep state, in which signal transmission from the base station is suspended, and a normal state, in which signal transmission from the base station is performed, based on a decision result of the decision function; and
a transmission control function to control start and suspension of signal transmission of a control signal including a pilot signal with predetermined power based on an instruction of the state change control function.

* * * * *